US012631943B1

(12) United States Patent
Bozkaya et al.

(10) Patent No.: US 12,631,943 B1
(45) Date of Patent: May 19, 2026

(54) SMART CAMERA SYSTEM HAVING MODULAR CAMERA SENSOR, LIGHT, AND COMPUTE ASSEMBLIES

(71) Applicant: Amazon Technologies, Inc., Seattle, WA (US)

(72) Inventors: Dincer Bozkaya, Andover, MA (US); Mark Anthony Begley, Brighton, MA (US); Wei Lee, Acton, MA (US); Christopher Park, Woburn, MA (US); Ann Fanghui Waye, Boston, MA (US); Sara Jean Woo, Andover, MA (US); Jarrod Donald Homer, Sleepy Hollow, NY (US); Aaron Hwang, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 34 days.

(21) Appl. No.: 18/757,014

(22) Filed: Jun. 27, 2024

(51) Int. Cl.
| | |
|---|---|
| G03B 17/14 | (2021.01) |
| G03B 15/03 | (2021.01) |
| G03B 17/55 | (2021.01) |
| H04N 23/52 | (2023.01) |
| H04N 23/54 | (2023.01) |
| H04N 23/56 | (2023.01) |
| H04N 23/90 | (2023.01) |

(52) U.S. Cl.
CPC ............. *G03B 17/14* (2013.01); *G03B 15/03* (2013.01); *G03B 17/55* (2013.01); *H04N 23/52* (2023.01); *H04N 23/54* (2023.01); *H04N 23/56* (2023.01); *H04N 23/90* (2023.01)

(58) Field of Classification Search
CPC ........ G03B 17/14; G03B 15/03; G03B 17/55; H04N 23/52; H04N 23/54; H04N 23/56; H04N 23/90
See application file for complete search history.

(56) References Cited

U.S. PATENT DOCUMENTS

| | | | |
|---|---|---|---|
| 9,066,446 B1* | 6/2015 | Olsson | H04N 23/51 |
| 2017/0208239 A1* | 7/2017 | Chien | H04N 23/667 |
| 2019/0089872 A1* | 3/2019 | Rukes | G03B 17/08 |
| 2019/0361194 A1* | 11/2019 | Nunnink | H04N 23/50 |
| 2023/0064678 A1* | 3/2023 | Lee | H04N 23/56 |
| 2023/0078421 A1* | 3/2023 | Han | H04N 23/57 |
| | | | 348/135 |

OTHER PUBLICATIONS

Rotor Clip, "Ultrasonic Motor Utilizing a Wave Spring," www.rotorclip.com, Rotor Clip Company, Inc, Accessed Apr. 25, 2024, URL: https://www.rotorclip.com/post/ultrasonic-motor-utilizing-a-wave-spring/, 5 pages.

* cited by examiner

*Primary Examiner* — Shahbaz Nazrul
(74) *Attorney, Agent, or Firm* — Athorus, PLLC

(57) ABSTRACT

Smart camera systems may comprise one or more modular assemblies, including a camera assembly, a light assembly, and a compute assembly. Each of the modular assemblies may be further formed from various modular components, circuits, or elements, and also include various modular software, applications, or algorithms related to image capture and processing. Using the modular assemblies, various different smart camera systems may be assembled that are adapted for different applications or environments.

19 Claims, 19 Drawing Sheets

SMART CAMERA SYSTEM HAVING MODULAR CAMERA SENSOR, LIGHT, AND COMPUTE ASSEMBLIES

BACKGROUND

Cameras may be used for various applications in warehouses, material handling facilities, distribution centers, or other similar facilities. For example, cameras may be used to scan barcodes or other identifiers associated with items, packages, or other objects. However, different applications or environments may benefit from different characteristics or capabilities of cameras and associated assemblies or subsystems. Accordingly, there is a need for smart camera systems having modular imaging sensors, lights, and compute assemblies that can be quickly and simply adapted and assembled for various different applications or environments.

DETAILED DESCRIPTION

Figure 1A:
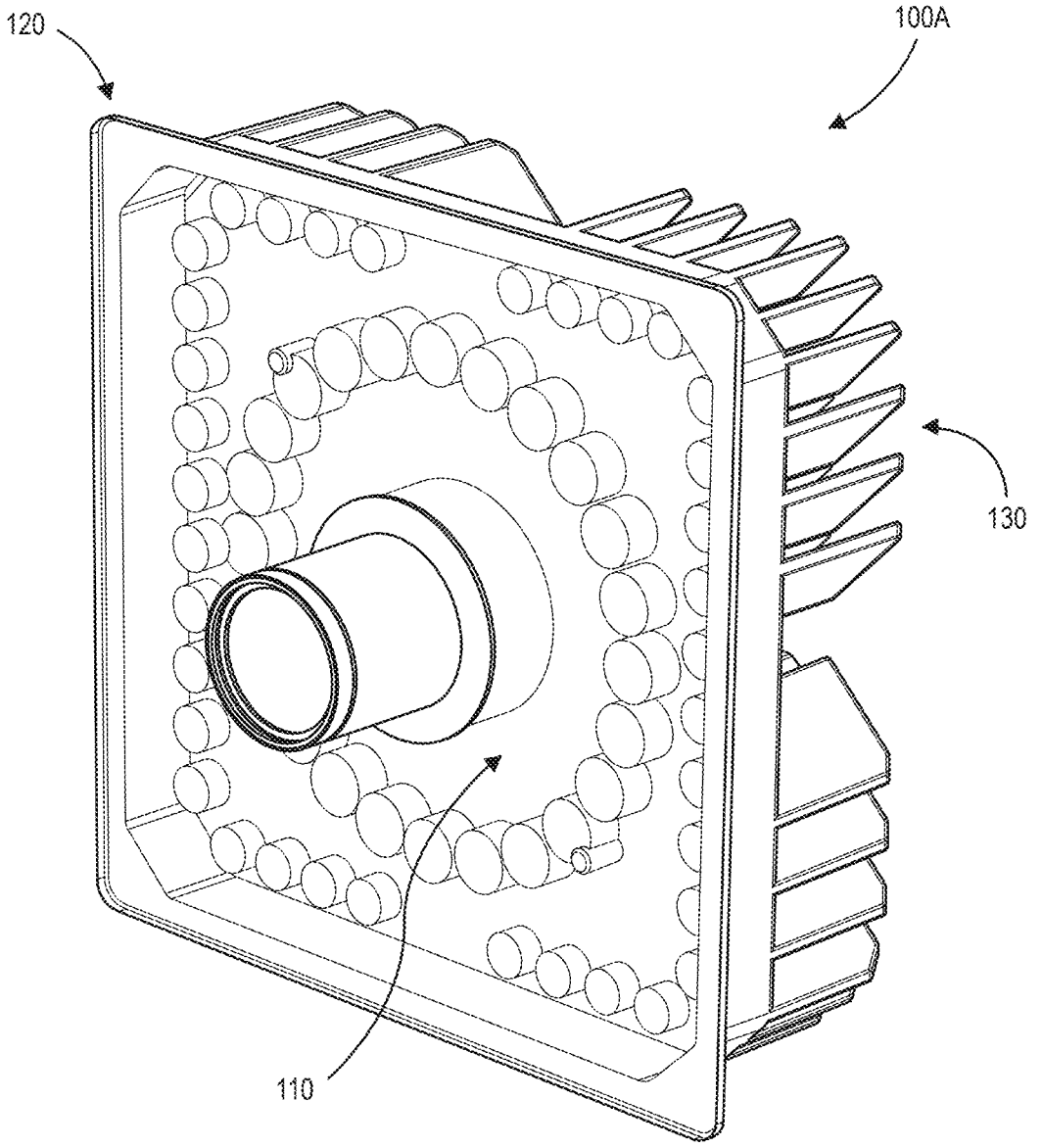
FIG. 1A is a schematic, front perspective view diagram of an example smart camera system, in accordance with implementations of the present disclosure.

As is set forth in greater detail below, implementations of the present disclosure are directed to smart camera systems having modular imaging sensors, lights, and compute assemblies that can be quickly and simply adapted and assembled for various different applications or environments.

In example embodiments, smart camera systems may be formed from various modular assemblies including camera assemblies, light assemblies, and compute assemblies. Various modular assemblies may be used individually, and various smart camera systems may include different combinations of two or more of the modular assemblies. Further, each modular assembly may comprise various modular components, parts, or elements.

The modular camera assembly may comprise a camera housing, an imaging sensor, a spring or bias element, and a lens. The imaging sensor, spring, and lens may comprise modular components, in which the imaging sensor may be selected from various different imaging sensors, the spring may be selected from various different springs, and the lens may also be selected from various different lenses. In addition, the various imaging sensors may each comprise a standardized interface or connector to the modular compute assembly.

The modular light assembly may comprise a light printed circuit board (PCB), a cover, and a heatsink. The light PCB, cover, and heatsink may comprise modular components, in which the light PCB may be selected from various different light PCBs, the cover may be selected from various different covers, such as diffusers, baffles, polarizers, or other covers or protection elements, and the heatsink may also be selected from various different heatsinks. In addition, the various light PCBs may each comprise a standardized interface or connector to the modular compute assembly.

The modular compute assembly may comprise a carrier board printed circuit board (PCB), a gasket or seal, a heatsink, and various peripheral components. The carrier board PCB, gasket, heatsink, and various peripherals may comprise modular components, in which the carrier board PCB may be selected from various different carrier board PCBs, the gasket may be selected from various different gaskets, the heatsink may also be selected from various different heatsinks, and the peripherals may also be selected from various different peripheral components, such as wireless antennas, push buttons, or other user interface elements. In addition, the various carrier board PCBs may each comprise standardized interfaces or connectors to each of the modular camera assembly and the modular light assembly.

In further example embodiments, the carrier board PCB may also comprise various modular components, such as various processors, various memories, various communication devices, or other components. In addition, the carrier board PCB may also include multiple or redundant components, such as multiple wireless antennas, both wireless and wired communication devices, multiple external connections, or other redundant components to facilitate assembly or formation of modular smart camera systems for various different applications or environments.

In still further example embodiments, various circuitry, software, applications, or algorithms associated with the imaging sensor, light PCB, or carrier board PCB may also have modular aspects. For example, various different camera assembly and/or light assembly control functions, operations, or applications, as well as various different imaging data processing applications, may be selected, loaded, or programmed onto the modular compute assembly. In addition, each of the imaging sensor, light PCB, and the carrier board PCB may comprise various control functions, operations, or applications, such that the camera assembly or light assembly may be operated and controlled independently when used individually or separately from a compute assembly, or the camera assembly and/or light assembly may be operated and controlled by the compute assembly when used together as a modular smart camera system.

As described herein, the smart camera systems may comprise various modular assemblies, including modular physical components or parts, modular electrical components, circuits, or elements, and/or modular software, applications, or algorithms. In this manner, smart camera systems having modular camera assemblies, light assemblies, and compute assemblies may be quickly and simply adapted and assembled for various different applications or environments.

Figure 1B:
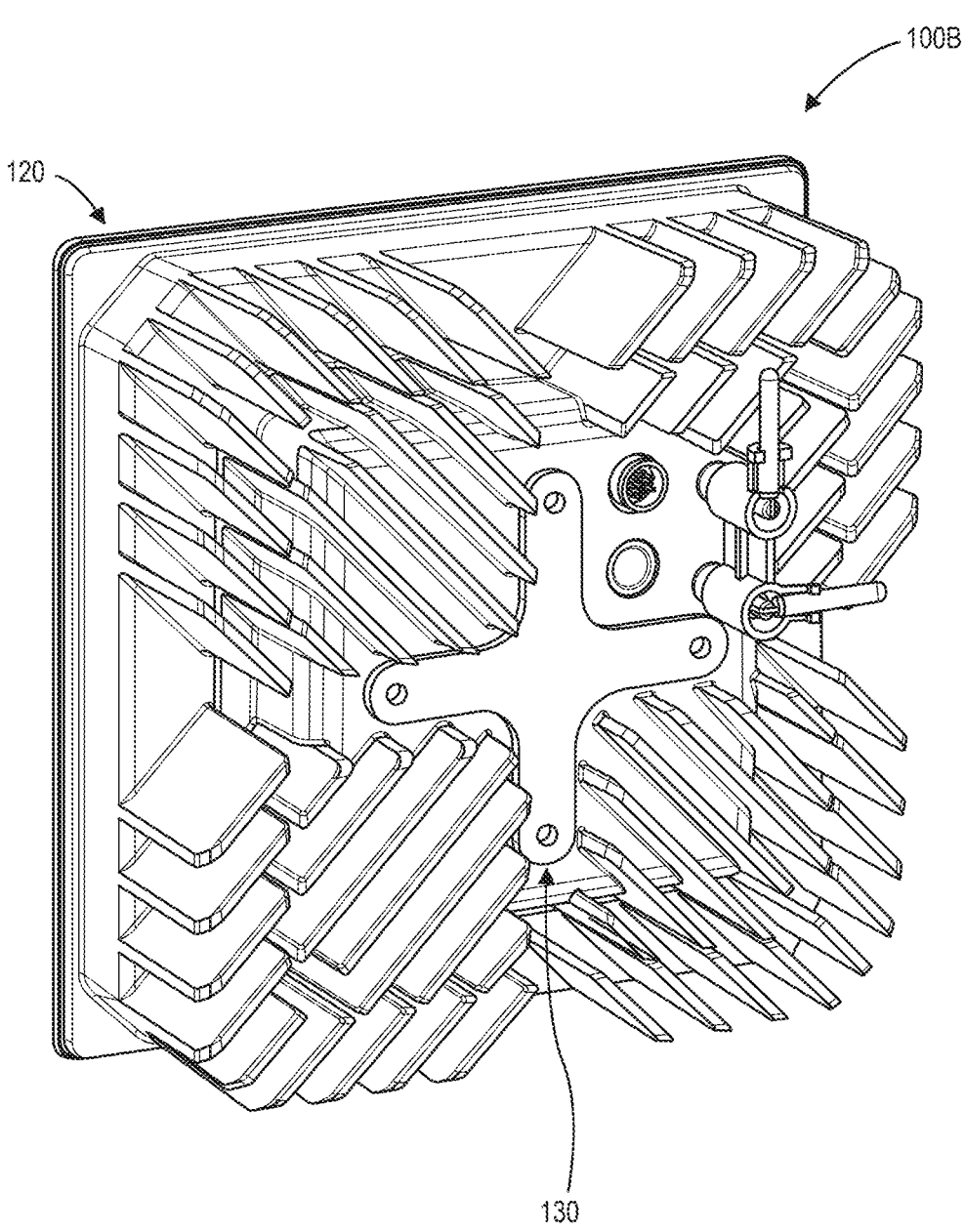
FIG. 1B is a schematic, rear perspective view diagram of an example smart camera system, in accordance with implementations of the present disclosure.

FIG. 1A is a schematic, front perspective view diagram 100A of an example smart camera system, in accordance with implementations of the present disclosure, and FIG. 1B is a schematic, rear perspective view diagram 100B of an example smart camera system, in accordance with implementations of the present disclosure.

As shown in FIGS. 1A and 1B, an example smart camera system may comprise a modular camera assembly 110, a modular light assembly 120, and a modular compute assembly 130. Individual components and elements of the modular assemblies 110, 120, 130 are described herein in more detail with respect to the remaining figures.

The example smart camera systems may be adapted and assembled for various different applications or environments, such as capturing imaging data of barcodes or other identifiers associated with items, packages, or other objects. In addition, the example smart camera systems may be adapted to capture imaging data of items, packages, objects, machinery, equipment, automated or robotic vehicles, or portions of environments, such as warehouses, distribution centers, material handling facilities, or other similar environments. Further, the example smart camera systems may be adapted for different environments, such as outdoors, indoors, dark or light environments, hot or cold environments, dry or wet environments, or other types of environments.

Figure 2A:
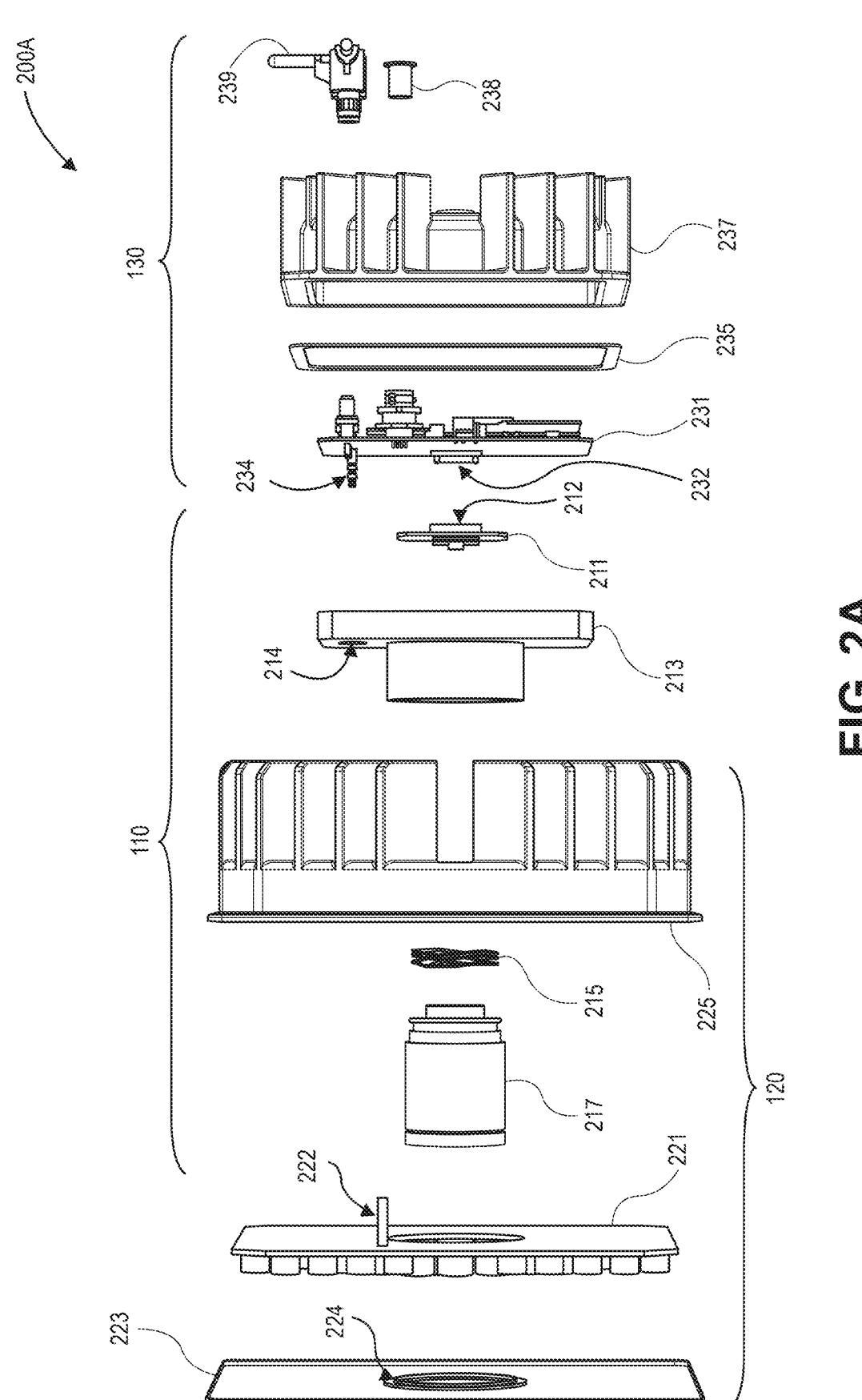
FIG. 2A is a schematic, side, exploded view diagram of an example smart camera system, in accordance with implementations of the present disclosure.
Figure 2B:
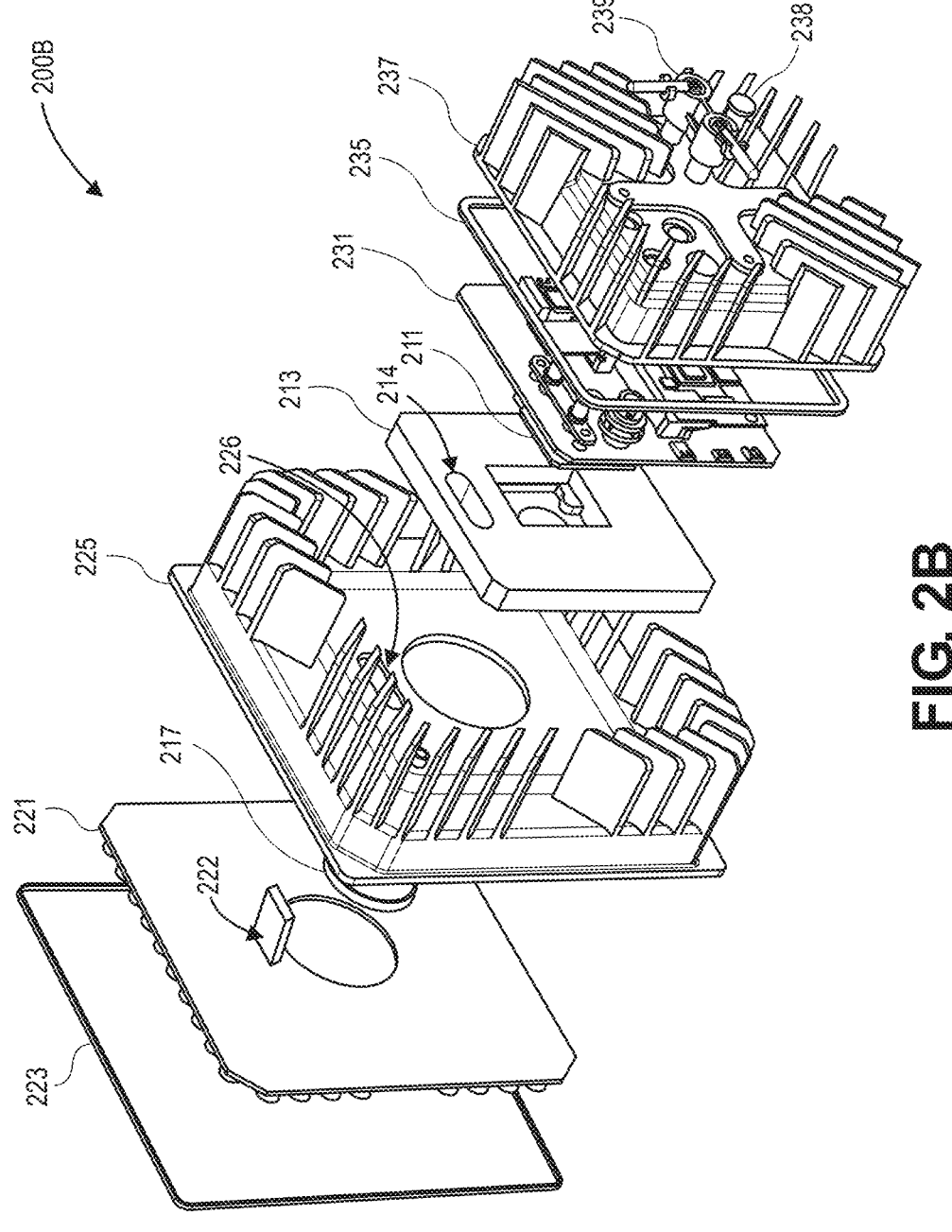
FIG. 2B is a schematic, rear perspective, exploded view diagram of an example smart camera system, in accordance with implementations of the present disclosure.

FIG. 2A is a schematic, side, exploded view diagram 200A of an example smart camera system, in accordance with implementations of the present disclosure, and FIG. 2B is a schematic, rear perspective, exploded view diagram of an example smart camera system, in accordance with implementations of the present disclosure.

As shown in FIGS. 2A and 2B, an example smart camera system may comprise a camera assembly 110, a light assembly 120, and a compute assembly 130. Each of the assemblies 110, 120, 130 may further comprise various modular parts, components, or elements.

For example, the camera assembly 110 may comprise an imaging sensor 211, a camera housing 213, a spring or bias element 215, and a lens 217. The imaging sensor 211 may be selected from a plurality of different imaging sensors. The different imaging sensors may comprise various types of imaging sensors, such as color, black and white, depth, or other types of imaging sensors. In addition, the different imaging sensors may comprise different resolutions, gains, frame capture rates including rolling shutter or global shutter, operational modes including continuous, intermittent, triggered, or other modes, or other imaging or image capture characteristics or attributes. Further, the different imaging sensors may each comprise a standardized interface or connector 212 configured to couple to a compute assembly 130, e.g., to a corresponding standardized interface or connector 232 of a carrier board PCB 231 of the compute assembly 130. The standardized interfaces or connectors 212, 232 may comprise a common shape, size, form factor, connections, or other aspects that enable physical, mechanical, and electrical connections between the different camera assemblies and different compute assemblies.

The camera housing 213 may comprise a standardized shape, size, or form factor that is configured to receive and couple to the different imaging sensors. For example, the camera housing 213 may include a central opening or aperture configured to securely receive the different imaging sensors, e.g., via various fasteners, slots, grooves, clips, clamps, adhesives, or other engagement elements. In addition, the camera housing 213 may comprise one or more guide pins that facilitate simple and correct assembly or coupling to a light assembly 120. Further details of example guide pins are described herein at least with respect to FIG. 3A.

Moreover, the camera housing 213 may also comprise a slot or hole 214 that is configured to allow engagement or coupling between a standardized interface or connector 222 of the light assembly 120 and a corresponding standardized interface or connector 234 of the compute assembly 130. For example, one or both standardized connectors 222, 234 may extend at least partially through the slot 214 of the camera housing 213 in order to connect or couple to each other. The standardized interfaces or connectors 222, 234 may comprise a common shape, size, form factor, connections, or other aspects that enable physical, mechanical, and electrical connections between the different light assemblies and different compute assemblies.

The spring or bias element 215 may also be selected from a plurality of different springs. For example, the different springs may comprise a wave spring, coil spring, disc spring, compressible material, or other types of springs or bias elements. The different springs may generate a preload between the camera housing 213 and the lens 217, in order to facilitate adjustment and maintenance of focus or other imaging properties of the camera assembly 110. Additional details of the spring 215, generated preload, and focus adjustment and maintenance are described in related U.S. application Ser. No. 18/756,681 filed on Jun. 27, 2024 by Applicant, the contents of which are incorporated herein by reference in their entirety.

The lens 217 may also be selected from a plurality of different lenses. For example, the different lenses may comprise C-mount lenses, S-mount lenses, or other types of lenses. Some example lenses may have outer diameters between approximately 43 mm diameter and approximately 51 mm diameter. Generally, the lenses may include threads in order to couple or connect to the camera housing 213 via threaded engagement of corresponding threads. In addition, the rotation of the different lenses relative to the camera housing 213, and subject to the preload generated by the spring 215, may enable adjustment of focus or other imaging properties of the camera assembly 110. Additional details of the lens 217 and focus adjustment subject to generated preload are described in related U.S. application Ser. No. 18/756,681 filed on Jun. 27, 2024 by Applicant, the contents of which are incorporated herein by reference in their entirety.

In some example embodiments, the standardized interface 212 of the imaging sensor 211 may be coupled or connected to a cable and associated connector, and the cable may enable connection to a computer, processor, or other remote system that can receive and process imaging data captured by the imaging sensor 211. In this manner, the camera assembly 110 may be used independently or separately from the compute assembly 130 in some alternative embodiments.

The light assembly 120 may comprise a light printed circuit board (PCB) 221 or printed circuit board assembly (PCBA), a cover 223, and a heatsink 225. The light PCB 221 may be selected from a plurality of different light PCBs. The different light PCBs may comprise various types of lights, such as color, white, or other types of light emitting diodes (LEDs) or light-emitting elements. In addition, the different light PCBs may comprise different numbers, types, arrangements, or combinations of light-emitting elements, as well as different brightness (lumens), power, color temperatures, or other lighting characteristics or attributes. Further, the different light PCBs may each comprise a standardized interface or connector 222 configured to couple to a compute assembly 130, e.g., to a corresponding standardized interface or connector 234 of a carrier board PCB 231 of the compute assembly 130 via a slot 214 of the camera housing 213. The standardized interfaces or connectors 222, 234 may comprise a common shape, size, form factor, connections, or other aspects that enable physical, mechanical, and electrical connections between the different light assemblies and different compute assemblies.

In addition, the different light PCBs may also include holes or slots that are configured to receive guide pins associated with the camera housing 213. The holes or slots of the different light PCBs may receive the guide pins, and facilitate simple and correct assembly or coupling between different light PCBs and the camera housing 213.

In some example embodiments, the standardized interface 222 of the light PCB 221 may be coupled or connected to a cable and associated connector, and the cable may enable connection to a computer, processor, compute assembly, or other remote system that can command or instruct emission of light by the light PCB 221. In this manner, the light assembly 120 may be used independently or separately, or in a movable, extendible, or retractable configuration as described herein at least with respect to FIGS. 6A, 6B, 7A, and 7B, relative to the compute assembly 130 in some alternative embodiments.

The cover 223 may be selected from a plurality of different covers. For example, the different covers may comprise thin sheets or films, e.g., transparent or translucent plastic films or other materials, that protect the light PCBs from an environment around the light assembly 120, and also allow transmission of light from the light PCBs through the different covers. In addition, the different covers may include a central opening or hole 224, e.g., a circular hole, that is sized or shaped to receive an outer diameter of the lens 217 of the camera assembly 110. The hole 224 may include a flexible or compliant material along the perimeter thereof, e.g., rubber, silicone, or other flexible, elastic materials, in order to generate at least a partial seal between the different covers and an outer diameter of the lens 217.

In additional example embodiments, the different covers may comprise various other light accessories. For example, one or more light diffusers, baffles, polarizers, or other accessories may be incorporated into the different covers, or may be included in the light assembly 120 together with or in place of the different covers. The various light accessories may adjust or modify characteristics of light emitted by the different light PCBs.

The heatsink 225 may also be selected from a plurality of different heatsinks. For example, the different heatsinks may be sized or shaped to couple to the different light PCBs and different covers, and the different heatsinks may be configured to receive or surround different camera assemblies 110, as well as different compute assemblies 130, to which the light assembly 120 may be assembled or connected. The different heatsinks may comprise various fins, vanes, extensions, or other features in various numbers, types, sizes, shapes, or arrangements to transfer and dissipate heat that may be generated by the different light PCBs of the light assembly 120.

In addition, the different heatsinks may also include holes or slots that are configured to receive guide pins associated with the camera housing 213. The holes or slots of the different heatsinks may receive the guide pins, and facilitate simple and correct assembly or coupling between different heatsinks of a light assembly 120 and the camera housing 213.

Moreover, the heatsink 225 may also comprise a slot or hole 226 that is configured to allow engagement or coupling between a standardized interface or connector 222 of the light assembly 120 and a corresponding standardized interface or connector 234 of the compute assembly 130. For example, one or both standardized connectors 222, 234 may extend at least partially through the slot 226 of the heatsink 225 in order to connect or couple to each other. The standardized interfaces or connectors 222, 234 may comprise a common shape, size, form factor, connections, or other aspects that enable physical, mechanical, and electrical connections between the different light assemblies and different compute assemblies.

The compute assembly 130 may comprise a carrier board printed circuit board (PCB) 231 or printed circuit board assembly (PCBA), a gasket or seal 235, a heatsink 237, and one or more peripherals 238, 239. The carrier board PCB 231 may be selected from a plurality of different carrier board PCBs. The different carrier board PCBs may comprise various processors, memories, communication devices, internal and/or external connectors, and/or other electrical components, circuits, or elements. In addition, the various components, circuits, or elements of different carrier board PCBs may be selected from a plurality of different components, circuits, or elements, such as multiple different processors, multiple different memories, multiple different communication devices, or others. Further details of the various components, circuits, or elements of different carrier board PCBs are described herein at least with respect to FIGS. 9-12.

Further, the different carrier board PCBs may each comprise a standardized interface or connector 232 configured to couple to a camera assembly 110, e.g., to a corresponding standardized interface or connector 212 of an imaging sensor 211 of the camera assembly 110. Moreover, the different carrier board PCBs may also each comprise a standardized interface or connector 234 configured to couple to a light assembly 120, e.g., to a corresponding standardized interface or connector 222 of a light PCB 221 of the light assembly 120 via slots 214, 226 of the camera housing 213 and heatsink 225, respectively. The standardized interfaces or connectors 212, 232 or 222, 234 may comprise a common shape, size, form factor, connections, or other aspects that enable physical, mechanical, and electrical connections between the different camera assemblies, different light assemblies, and different compute assemblies.

In some example embodiments, the standardized interfaces 232, 234 of the carrier board PCB 231 may be coupled or connected to respective cables and associated connectors, and the cables may enable connection to independent, separate, or remote camera assemblies and/or light assemblies. In this manner, the compute assembly 130 may be used independently or separately, or in a movable, extendible, or retractable configuration as described herein at least with respect to FIGS. 6A, 6B, 7A, and 7B, relative to the camera assembly 110 and/or the light assembly 120 in some alternative embodiments.

The gasket 235 may be selected from a plurality of different gaskets or seals. For example, the different gaskets may comprise thin films, sheets, adhesives, or beads of material, e.g., rubber, silicone, or other flexible, elastic materials, that protect the carrier board PCBs, as well as imaging sensors, from an environment around the compute assembly 130 and/or camera assembly 110. In some examples, the gasket 235 may be positioned to form a seal between a surface of the heatsink 225 of the light assembly 120, and a mating surface of a heatsink 237 of the compute assembly 130. In other examples, the gasket 235 may be positioned to form a seal between a surface of the camera housing 213 of the camera assembly 110, and a mating surface of a heatsink 237 of the compute assembly 130.

The heatsink 237 may also be selected from a plurality of different heatsinks. For example, the different heatsinks may be sized or shaped to couple to the different carrier board PCBs and different gaskets, and the different heatsinks may be configured to adhere or couple within a periphery or outer extent of respective heatsinks of different light assemblies 120, to which the compute assembly 130 may be assembled or connected. The different heatsinks may couple or attach to the camera housing 213 of the camera assembly 110, and/or to the heatsink 225 of the light assembly 120, via various fasteners, slots, grooves, clips, clamps, adhesives, or other engagement elements. The different heatsinks may comprise various fins, vanes, extensions, or other features in various numbers, types, sizes, shapes, or arrangements to transfer and dissipate heat that may be generated by the different carrier board PCBs of the compute assembly 130.

The peripherals, such as push buttons 238, wireless antennas 239, or other user interface elements, may be coupled to respective connectors or interfaces of the carrier board PCBs via access holes or openings of the heatsinks. The push buttons 238, wireless antennas 239, or other user interface elements may also be selected from a plurality of different related peripherals. The peripherals may be operatively coupled to portions of the carrier board PCBs to perform various functions or operations, e.g., to enable wireless connectivity to one or more networks for data communication, to enable interaction with one or more components, circuits, or elements of the carrier board PCBs, e.g., turning on or off, resetting, forced recovery, or other functions, and/or to perform various other functions or operations.

In various example embodiments, the individual modular assemblies may be combined in various combinations. For example, each modular assembly, e.g., camera assembly, light assembly, and compute assembly, may be used independently and separately from other assemblies. In addition, two modular assemblies may be combined and used together, e.g., a combined light and camera assembly, a combined light and compute assembly, or a combined camera and compute assembly. Further, the three modular assemblies may be used as a single unit, e.g., a combined light, camera, and compute assembly. Moreover, because each modular assembly includes further modular components or elements, the various individual assemblies, as well as various combinations of two or more assemblies, can comprise multiple different combinations of particular modular components or elements.

Figure 3A:
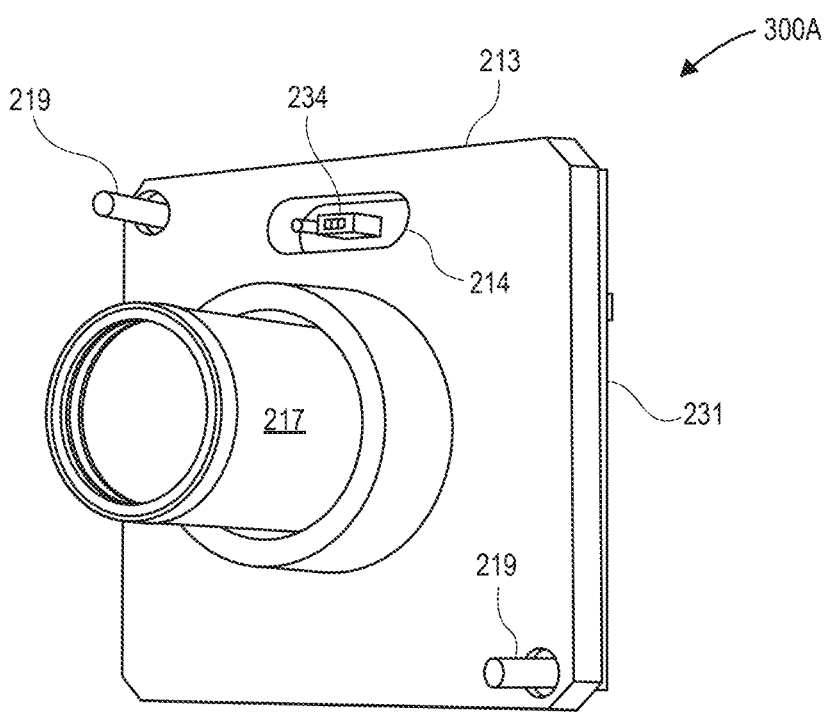
FIG. 3A is a schematic, front perspective view diagram of an example portion of a smart camera system, in accordance with implementations of the present disclosure.
Figure 3B:
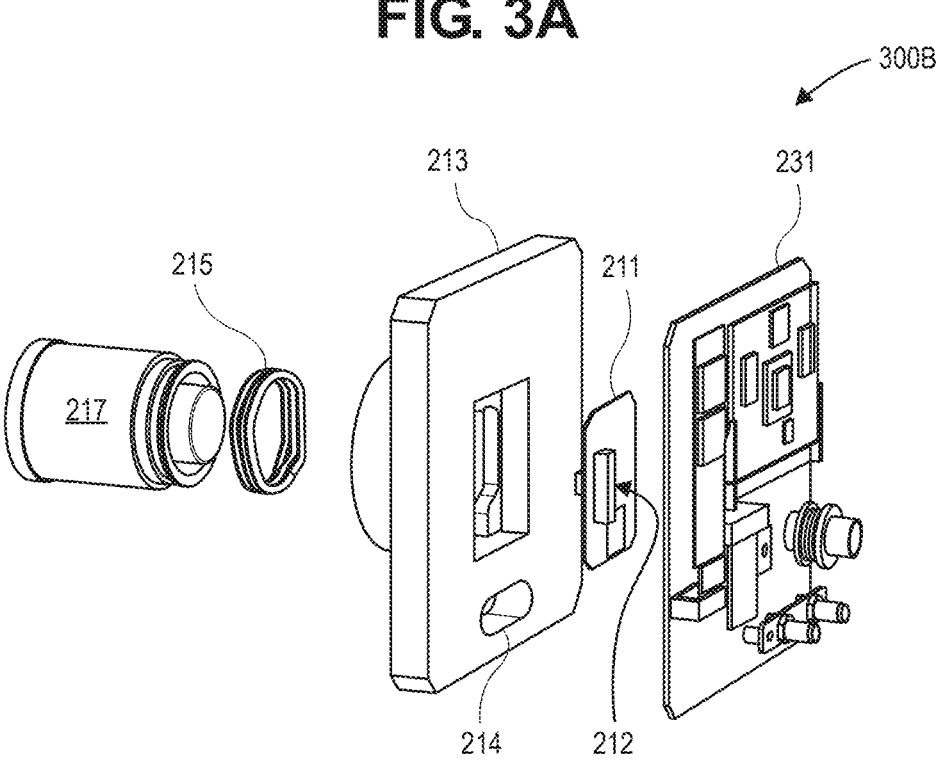
FIG. 3B is a schematic, rear perspective, exploded view diagram of an example portion of a smart camera system, in accordance with implementations of the present disclosure.

FIG. 3A is a schematic, front perspective view diagram 300A of an example portion of a smart camera system, in accordance with implementations of the present disclosure, and FIG. 3B is a schematic, rear perspective, exploded view diagram 300B of an example portion of a smart camera system, in accordance with implementations of the present disclosure.

As shown in FIGS. 3A and 3B, the example smart camera system may comprise a camera assembly and at least a portion of a compute assembly. For example, the camera assembly may comprise an imaging sensor 211 with a standardized interface 212, a camera housing 213 with a slot 214, a spring 215, and a lens 217. In addition, the portion of the compute assembly may comprise a carrier board PCB 231 with standardized interfaces 232, 234.

The camera housing 213 may further comprise one or more guide pins 219, as illustrated in FIG. 3A. The guide pins 219 may be inserted into corresponding holes or slots of portions of a light assembly, e.g., a light PCB and/or a heatsink, in order to aid assembly or coupling between the light assembly and the camera housing 213 of the camera assembly. Various fasteners, adhesives, clips, clamps, or other engagement elements may further assemble, couple, or connect the light assembly and the camera assembly.

As further shown in FIG. 3A, the standardized interface 234 of the carrier board PCB 231 may extend at least partially through a slot 214 of the camera housing 213, in order to couple or connect to a standardized interface 222 of a light assembly. In examples in which a light assembly is not used or assembled with a compute assembly and/or a camera assembly, the standardized interface 234 and slot 214 may be covered or sealed, e.g., by a separate cover, insert, or element. For example, the cover or insert may comprise a plastic or metal plug, cover, or insert that is configured to fit within the slot 214 and/or engage with a portion of the standardized interface 234.

As shown in FIG. 3B, only a carrier board PCB 231 of a compute assembly may be connected or coupled to a camera assembly. In such examples, the rear or back face, e.g., a surface facing away from the camera assembly, may also be covered or sealed, e.g., by a separate cover, plate, or element. For example, the cover or plate may comprise a plastic or metal housing, cover, or shield that is configured to surround and enclose the rear face of the carrier board PCB 231 and/or engage with a portion of the camera housing 213. Various fasteners, adhesives, clips, clamps, or other engagement elements may further assemble, couple, or connect the camera assembly and the compute assembly.

Figure 4:
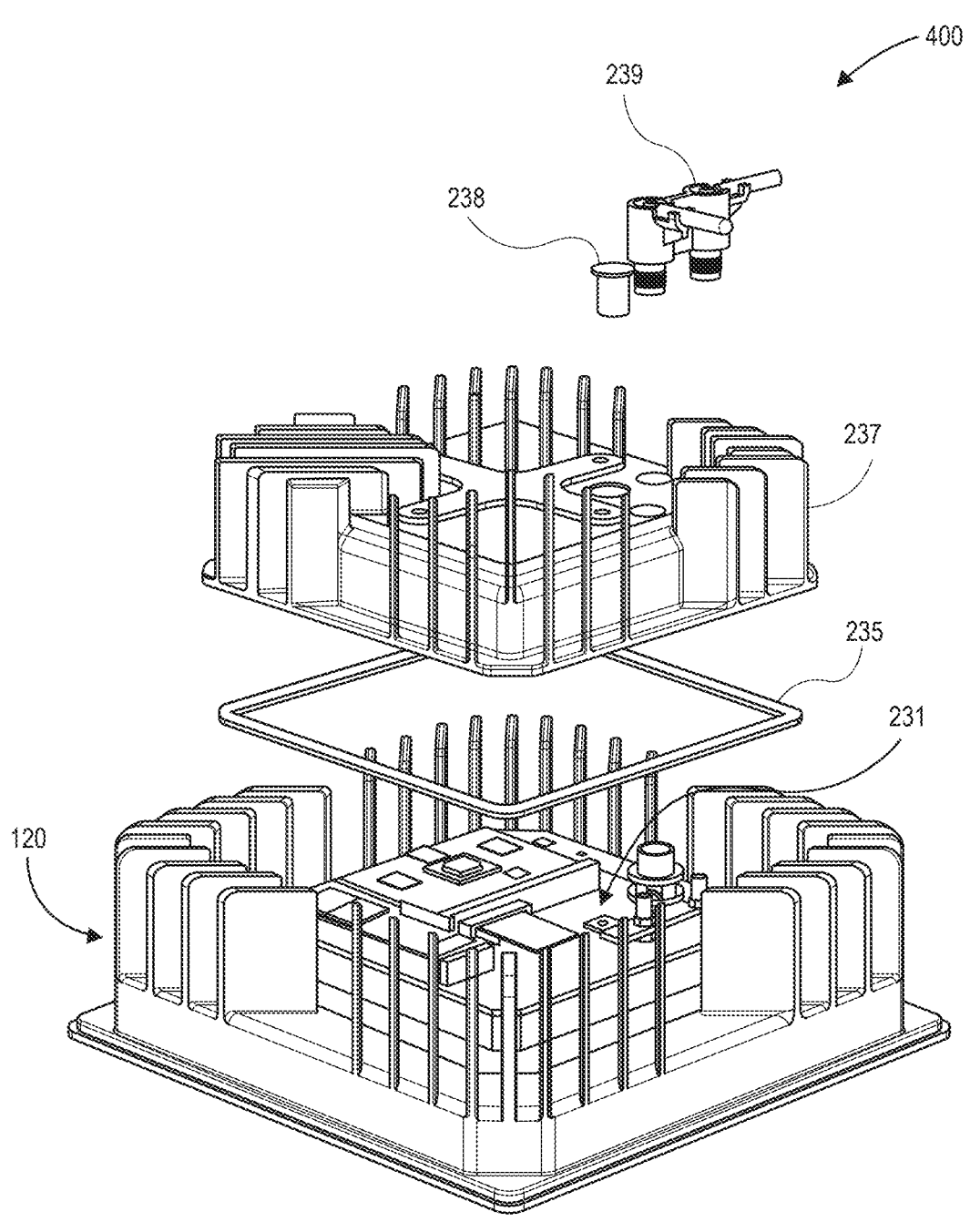
FIG. 4 is a schematic, rear perspective, exploded view diagram of another example portion of a smart camera system, in accordance with implementations of the present disclosure.

FIG. 4 is a schematic, rear perspective, exploded view diagram 400 of another example portion of a smart camera system, in accordance with implementations of the present disclosure.

As shown in FIG. 4, the example smart camera system may comprise a light assembly 120 and a compute assembly, and may or may not include a camera assembly. For example, the light assembly 120 may comprise a light PCB, a cover, and a heatsink. In addition, the compute assembly may comprise a carrier board PCB 231, a gasket 235, a heatsink 237, and peripherals 238, 239. In examples in which a camera assembly is also included, the camera assembly may comprise an imaging sensor, a camera housing, a spring, and a lens.

The carrier board PCB 231 may be positioned, seated, or assembled within a central region or area of a heatsink of the light assembly 120, and may also be operatively coupled or connected to the light assembly 120 and/or a camera assembly via standardized interfaces or connectors described herein. Various fasteners, adhesives, clips, clamps, or other engagement elements may further assemble, couple, or connect the carrier board PCB 231 of the compute assembly to the heatsink of the light assembly and/or to the camera housing of the camera assembly.

The gasket 235 may form a seal around a periphery of the carrier board PCB 231 and/or with a portion of a rear face of the heatsink of the light assembly 120. In addition, the heatsink 237 may substantially enclose or surround the carrier board PCB 231, and may form the seal with the gasket 235 around the periphery of the carrier board PCB 231. Various fasteners, adhesives, clips, clamps, or other engagement elements may further assemble, couple, or connect the heatsink 237 of the compute assembly to the heatsink of the light assembly and/or to the camera housing of the camera assembly.

Further, various peripherals, e.g., a push button 238 and wireless antennas 239, may couple to respective portions of the carrier board PCB 231 that at least partially extend through a corresponding region or area of the heatsink 237.

Figure 5:
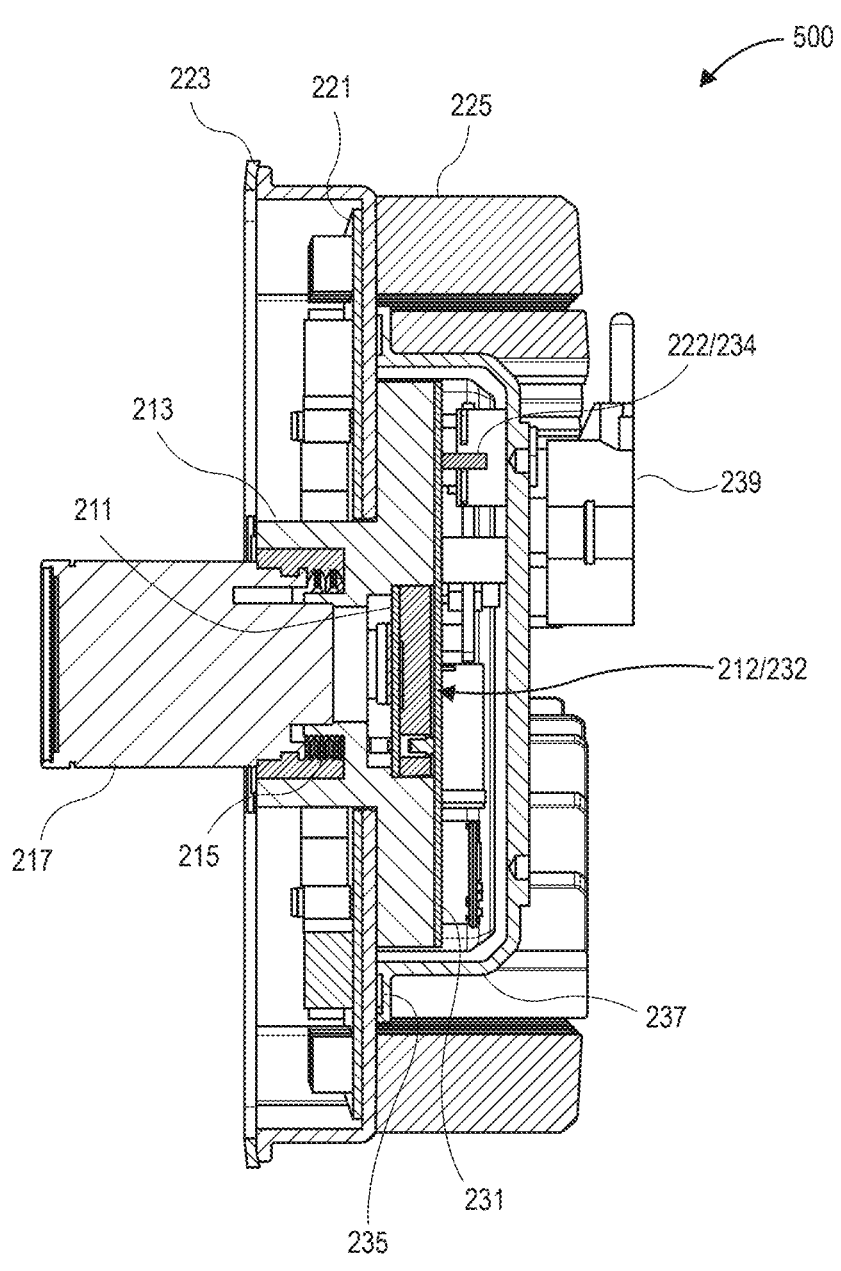
FIG. 5 is a schematic, side cross-sectional view diagram of an example smart camera system, in accordance with implementations of the present disclosure.

FIG. 5 is a schematic, side cross-sectional view diagram 500 of an example smart camera system, in accordance with implementations of the present disclosure.

As shown in FIG. 5, the example smart camera system may comprise all three modular assemblies, e.g., a camera assembly, a light assembly, and a compute assembly. As described herein, the camera assembly may comprise an imaging sensor 211 with standardized interface 212, a camera housing 213, a spring 215, and a lens 217. In addition, the light assembly may comprise a light PCB 221 with standardized interface 222, a cover 223, and a heatsink 225. Further, the compute assembly may comprise a carrier board PCB 231 with standardized interfaces 232, 234, a gasket 235, a heatsink 237, and peripherals 239.

Various example embodiments of the example smart camera system may comprise combinations of two or more of the modular assemblies. For example, some example embodiments may comprise combined camera and compute assemblies, combined light and compute assemblies, or combined camera and light assemblies. In addition, other example embodiments such as that illustrated in FIG. 5, may comprise all three modular assemblies.

Furthermore, each of the various example embodiments may include sufficient sealing to meet one or more standards for ingress protection, e.g., an IP52 rating or standard. Some example embodiments may include various additional covers, plugs, inserts, plates, shields, or other elements that are assembled, coupled, or connected to portions of the embodiments to provide sealing. Specifically, if any of the standardized interfaces or connectors described herein are not utilized in some example embodiments, one or more covers, plugs, inserts, plates, shields, or other elements may be coupled or connected to such unused standardized interfaces to provide protection and sealing.

Figure 6A:
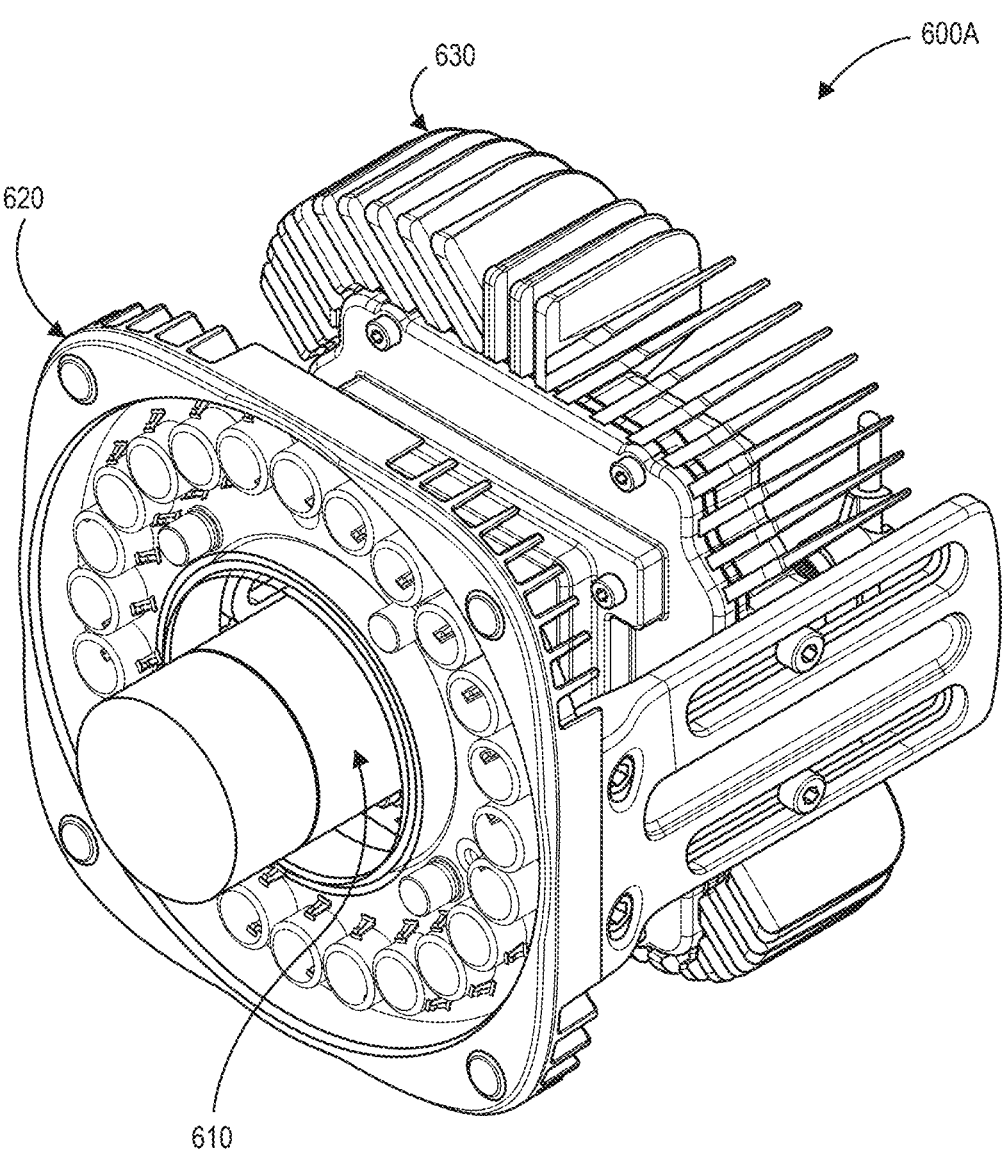
FIG. 6A is a schematic, front perspective view diagram of another example smart camera system, in accordance with implementations of the present disclosure.

FIG. 6A is a schematic, front perspective view diagram 600A of another example smart camera system, in accordance with implementations of the present disclosure.

As shown in FIG. 6A, another example smart camera system may comprise a camera assembly 610, a light assembly 620, and a compute assembly 630. The various modular assemblies illustrated in FIG. 6A may comprise any and all of the features of various camera, light, and compute assemblies described herein at least with respect to FIGS. 1A-5, as well as the features described herein with respect to FIGS. 6B, 6C, 7A, and 7B.

Figure 6B:
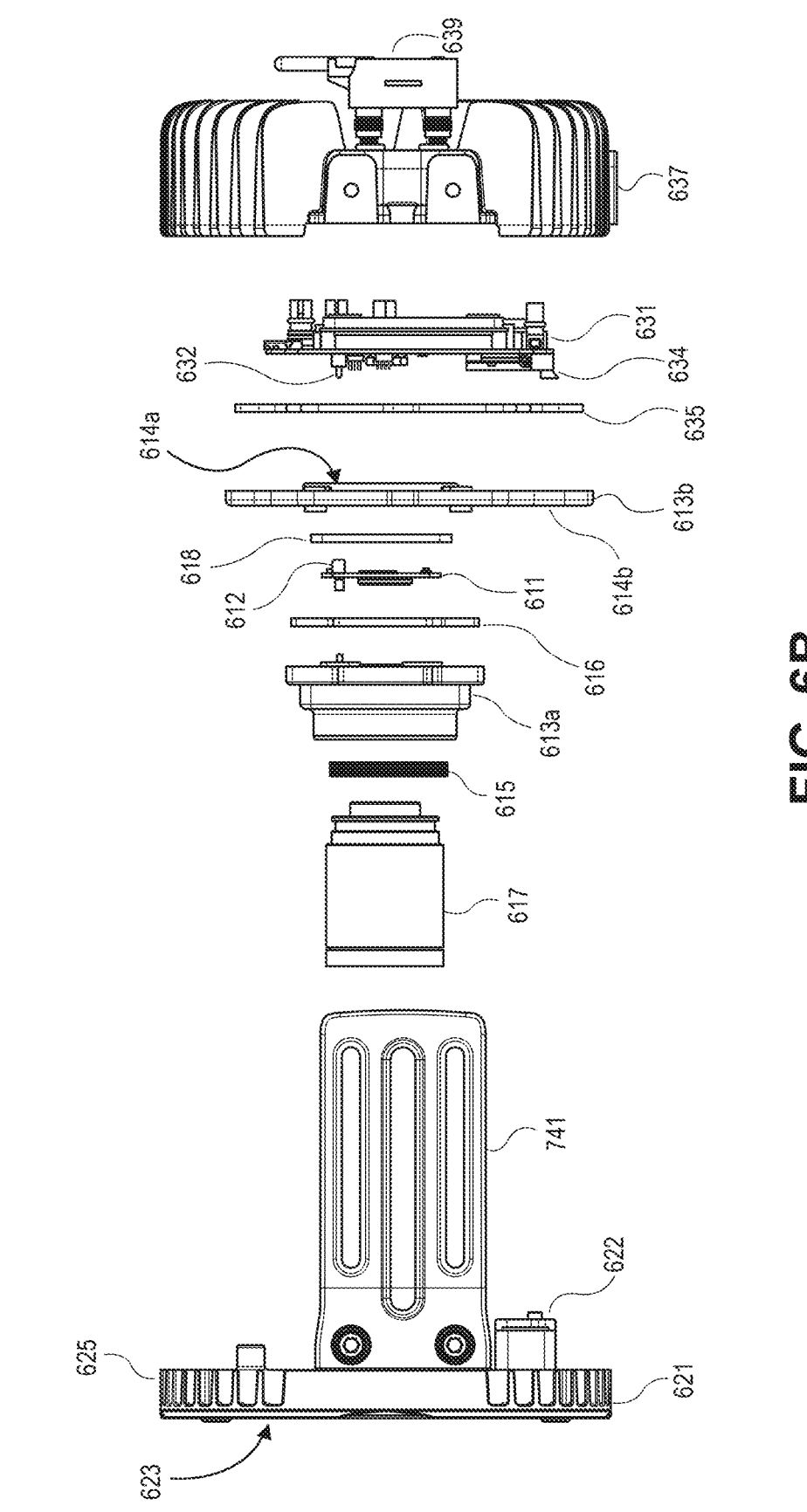
FIG. 6B is a schematic, side, exploded view diagram of the example smart camera system of FIG. 6A, in accordance with implementations of the present disclosure.
Figure 6C:
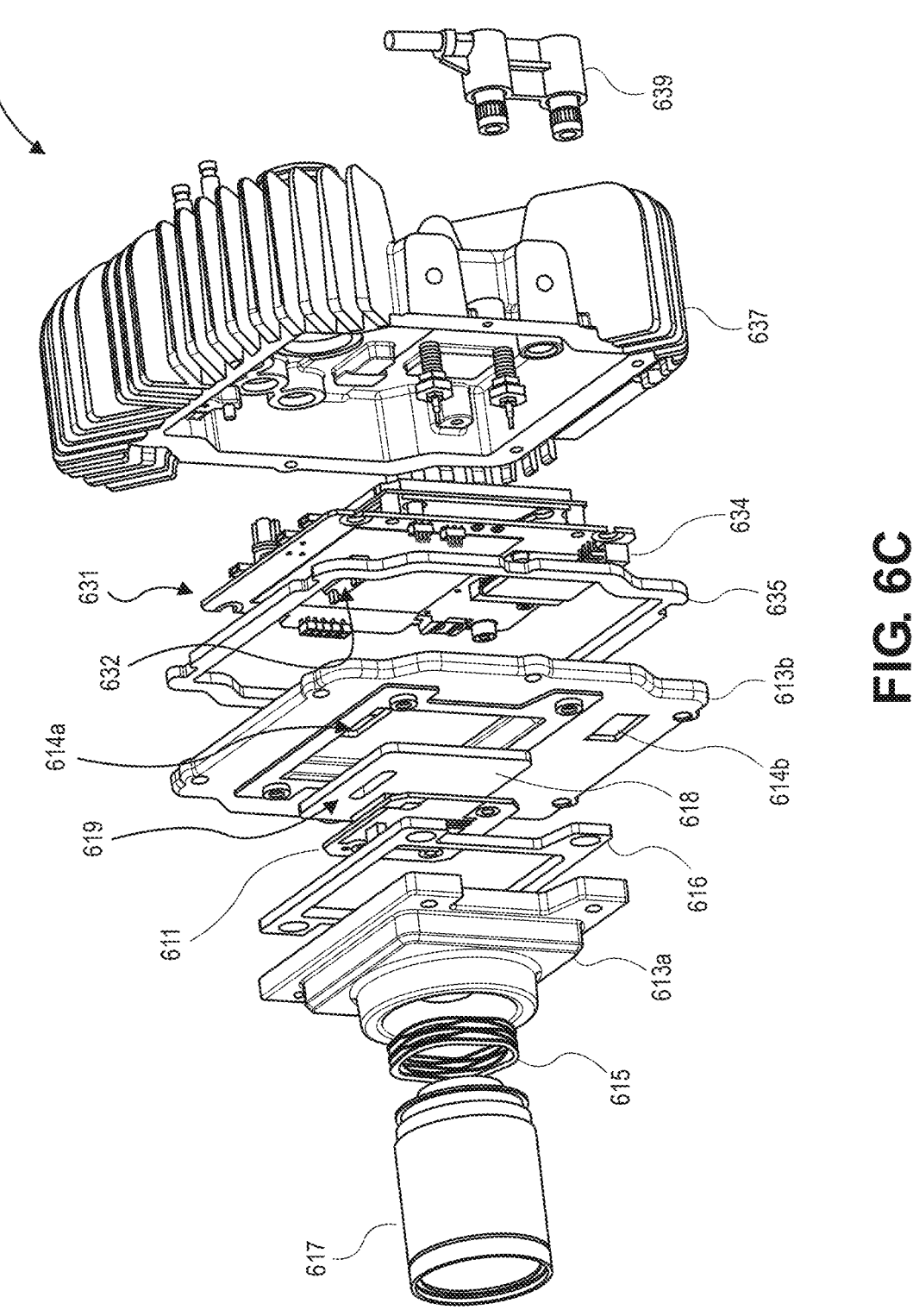
FIG. 6C is a schematic, front perspective, exploded view diagram of an example portion of the smart camera system of FIGS. 6A and 6B, in accordance with implementations of the present disclosure.

FIG. 6B is a schematic, side, exploded view diagram 600B of the example smart camera system of FIG. 6A, in accordance with implementations of the present disclosure, and FIG. 6C is a schematic, front perspective, exploded view diagram 600C of an example portion of the smart camera system of FIGS. 6A and 6B, in accordance with implementations of the present disclosure.

As shown in FIGS. 6A-6C, an example smart camera system may comprise a camera assembly 610, a light assembly 620, and a compute assembly 630. Each of the assemblies 610, 620, 630 may further comprise various modular parts, components, or elements.

For example, the camera assembly 610 may comprise an imaging sensor 611 with a standardized interface or connector 612, a camera housing 613a, 613b, a spring or bias element 615, a seal 616, a lens 617, and a thermal insulator 618. The imaging sensor 611, the spring 615, and the lens 617 may comprise any and all of the features of similar components described herein at least with respect to FIGS. 1A-5.

The camera housing 613a, 613b may comprise a two-part, standardized shape, size, or form factor that is configured to receive and couple to the different lenses and different imaging sensors. For example, the camera housing may comprise a camera housing lens mount 613a and a camera housing plate 613b. The spring 615 and lens 617 may couple or connect to a first side of the camera housing lens mount 613a, and the imaging sensor 611 may couple or connect to, or be received in, a central opening or aperture on a second, opposite side of the camera housing lens mount 613a that is configured to securely receive different imaging sensors, e.g., via various fasteners, slots, grooves, clips, clamps, adhesives, or other engagement elements. Further, the camera housing lens mount 613a may couple or connect with the camera housing plate 613b to substantially enclose or surround the imaging sensor 611 in an interior thereof, and a seal 616 may be positioned between the camera housing lens mount 613a and the camera housing plate 613b to prevent ingress of moisture, dirt, debris, or other contaminants. The seal 616 may include any and all of the features described herein with respect to other seals or gaskets, e.g., gaskets 235, 635.

Moreover, the camera housing plate 613*b* may comprise a first slot or hole 614*a* that is configured to allow engagement or coupling between a standardized interface or connector 612 of the imaging sensor 611 and a corresponding standardized interface or connector 632 of the compute assembly 630. In addition, the camera housing plate 613*b* may also comprise a second slot or hole 614*b* that is configured to allow engagement or coupling between a standardized interface or connector 622 of the light assembly 620 and a corresponding standardized interface or connector 634 of the compute assembly 630. For example, one or both pairs of standardized connectors 612, 632 and 622, 634 may extend at least partially through the respective slots 614*a*, 614*b* of the camera housing plate 613*b* in order to connect or couple to each other. The standardized interfaces or connectors 612, 632, 622, 634 may comprise a common shape, size, form factor, connections, or other aspects that enable physical, mechanical, and electrical connections between the different camera, light, and compute assemblies.

In some example embodiments, the standardized interface 612 of the imaging sensor 611 may be coupled or connected to a cable and associated connector, and the cable may enable connection to a computer, processor, or other remote system that can receive and process imaging data captured by the imaging sensor 611. In this manner, the camera assembly 610 may be used independently or separately from the light assembly 620 and compute assembly 630 in some alternative embodiments.

Furthermore, a thermal insulator 618 may be coupled or connected between the imaging sensor 611 and the camera housing plate 613*b*, with a carrier board PCB 631 of the compute assembly 630 being positioned on a side of the camera housing plate 613*b* opposite from the imaging sensor 611. In this manner, the thermal insulator 618 may thermally separate, insulate, and/or decouple the imaging sensor 611 from the carrier board PCB 631, which may generate and/or release varying amounts of heat energy during operation. For example, the thermal insulator 618 may comprise various insulative materials, such as foam, rubber, silicone, plastics, other insulative materials, or combinations thereof. Furthermore, the thermal insulator 618 may also comprise a slot or hole 619 that is configured to allow engagement or coupling between a standardized interface or connector 612 of the imaging sensor 611 and a corresponding standardized interface or connector 632 of the compute assembly 630.

The light assembly 620 may comprise a light printed circuit board (PCB) 621 or printed circuit board assembly (PCBA) with a standardized interface or connector 622, a cover 623, and a heatsink 625. The light PCB 621, the cover 623, and the heatsink 625 may comprise any and all of the features of similar components described herein at least with respect to FIGS. 1A-5. Further, the different light PCBs may each comprise a standardized interface or connector 622 configured to couple to a compute assembly 630, e.g., to a corresponding standardized interface or connector 634 of a carrier board PCB 631 of the compute assembly 630 via a slot 614*b* of the camera housing plate 613*b*. The standardized interfaces or connectors 622, 634 may comprise a common shape, size, form factor, connections, or other aspects that enable physical, mechanical, and electrical connections between the different light assemblies and different compute assemblies.

In some example embodiments, the standardized interface 622 of the light PCB 621 may be coupled or connected to a cable and associated connector, and the cable may enable connection to a computer, processor, compute assembly, or other remote system that can command or instruct emission of light by the light PCB 621. In this manner, the light assembly 620 may be used independently or separately, or in a movable, extendible, or retractable configuration as described herein at least with respect to FIGS. 6A, 6B, 7A, and 7B, relative to the camera assembly 610 and compute assembly 630 in some alternative embodiments.

In example embodiments, the light assembly 620 may also comprise one or more brackets or arms 741 that are fixedly coupled to portions of the light assembly 620, e.g., to the light PCB 621, the heatsink 625, or other portions of the light assembly 620. As further described herein with respect to FIGS. 7A and 7B, the brackets 741 may each include one or more slots or tracks that are configured to receive one or more pins, screws, or bolts that are inserted or fastened to portions of the camera assembly 610 or compute assembly 630, e.g., to the heatsink 637 of the compute assembly 630. Moreover, the brackets 741 may enable extension or retraction of the light assembly 620 relative to the camera assembly 610 and compute assembly 630.

The compute assembly 630 may comprise a carrier board printed circuit board (PCB) 631 or printed circuit board assembly (PCBA) with standardized interfaces or connectors 632, 634, a gasket or seal 635, a heatsink 637, and one or more peripherals 639. The carrier board PCB 631, the seal 635, the heatsink 637, and the peripherals 639 may comprise any and all of the features of similar components described herein at least with respect to FIGS. 1A-5.

The carrier board PCB 631 may be selected from a plurality of different carrier board PCBs. The different carrier board PCBs may comprise various processors, memories, communication devices, internal and/or external connectors, and/or other electrical components, circuits, or elements. In addition, the various components, circuits, or elements of different carrier board PCBs may be selected from a plurality of different components, circuits, or elements, such as multiple different processors, multiple different memories, multiple different communication devices, or others. Further details of the various components, circuits, or elements of different carrier board PCBs are described herein at least with respect to FIGS. 9-12.

Further, the different carrier board PCBs may each comprise a standardized interface or connector 632 configured to couple to a camera assembly 610, e.g., to a corresponding standardized interface or connector 612 of an imaging sensor 611 of the camera assembly 610 via slot 614*a* of the camera housing plate 613*b*. Moreover, the different carrier board PCBs may also each comprise a standardized interface or connector 634 configured to couple to a light assembly 620, e.g., to a corresponding standardized interface or connector 622 of a light PCB 621 of the light assembly 620 via slot 614*b* of the camera housing plate 613*b*. The standardized interfaces or connectors 612, 632 or 622, 634 may comprise a common shape, size, form factor, connections, or other aspects that enable physical, mechanical, and electrical connections between the different camera, light, and compute assemblies.

In some example embodiments, the standardized interfaces 632, 634 of the carrier board PCB 631 may be coupled or connected to respective cables and associated connectors, and the cables may enable connection to independent, separate, or remote camera assemblies and/or light assemblies. In this manner, the compute assembly 630 may be used independently or separately, or in a movable, extendible, or retractable configuration as described herein at least with respect to FIGS. 6A, 6B, 7A, and 7B, relative to the camera assembly 610 and/or the light assembly 620 in some alternative embodiments.

The gasket 635 may be selected from a plurality of different gaskets or seals. For example, the different gaskets may comprise thin films, sheets, adhesives, or beads of material, e.g., rubber, silicone, or other flexible, elastic materials, that protect the carrier board PCBs, as well as imaging sensors, from an environment around the compute assembly 630 and/or camera assembly 610. In some examples, the gasket 635 may be positioned to form a seal between a surface of the camera housing plate 613b of the camera assembly 610, and a mating surface of a heatsink 637 of the compute assembly 630.

In various example embodiments, the individual modular assemblies may be combined in various combinations. For example, each modular assembly, e.g., camera assembly, light assembly, and compute assembly, may be used independently and separately from other assemblies. In addition, two modular assemblies may be combined and used together, e.g., a combined light and camera assembly, a combined light and compute assembly, or a combined camera and compute assembly. Further, the three modular assemblies may be used as a single unit, e.g., a combined light, camera, and compute assembly. Moreover, because each modular assembly includes further modular components or elements, the various individual assemblies, as well as various combinations of two or more assemblies, can comprise multiple different combinations of particular modular components or elements.

Figure 7A:
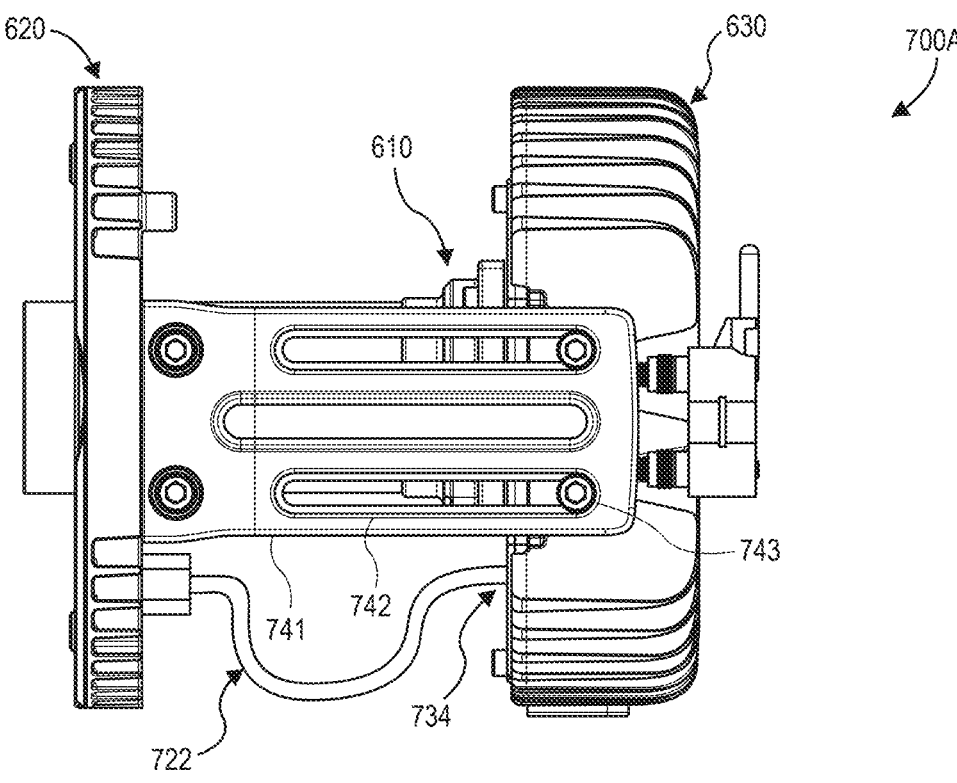
FIG. 7A is a schematic, side view diagram of the example smart camera system of FIGS. 6A and 6B with a light assembly in an extended position, in accordance with implementations of the present disclosure.
Figure 7B:
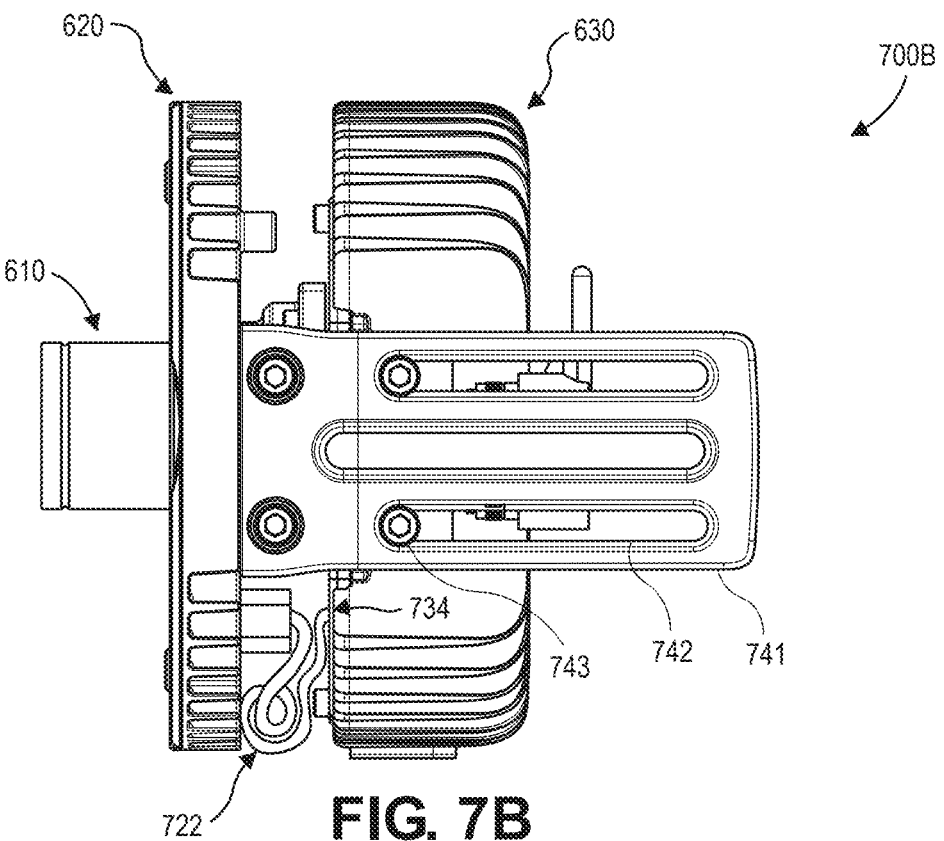
FIG. 7B is a schematic, side view diagram of the example smart camera system of FIGS. 6A and 6B with a light assembly in a retracted position, in accordance with implementations of the present disclosure.

FIG. 7A is a schematic, side view diagram 700A of the example smart camera system of FIGS. 6A and 6B with a light assembly in an extended position, in accordance with implementations of the present disclosure, and FIG. 7B is a schematic, side view diagram 700B of the example smart camera system of FIGS. 6A and 6B with a light assembly in a retracted position, in accordance with implementations of the present disclosure.

As shown in FIGS. 7A and 7B, the example smart camera system of FIGS. 6A and 6B may comprise an extendible and retractable light assembly 620. For example, the light assembly 620 may move or slide between an extended position as shown in FIG. 7A, and a retracted position as shown in FIG. 7B. The various modular assemblies illustrated in FIGS. 7A and 7B may comprise any and all of the features of various camera, light, and compute assemblies described herein at least with respect to FIGS. 1A-6C.

In order to enable extension and retraction of the light assembly 620 relative to the camera assembly 610 and the compute assembly 630, the light assembly 620 may comprise one or more brackets or arms 741 that are fixedly coupled to portions of the light assembly 620, e.g., to a heatsink or other portion of the light assembly 620. In addition, the brackets 741 may each include one or more slots or tracks 742 that are configured to receive one or more pins, screws, or bolts 743 that are inserted or fastened to portions of the camera assembly 610 or compute assembly 630.

When moving the light assembly 620 to the extended position, the retracted position, or any other position therebetween, the screws 743 may be loosened, the light assembly 620 and brackets 741 may be moved or slid along the slots 742 to a desired position, and the screws 743 may again be tightened to hold the new position of the light assembly 620.

Furthermore, in order to maintain an electrical connection between the light assembly 620 and the camera and compute assemblies 610, 630 at the various extended or retracted positions of the light assembly 620, the standardized interface or connector may comprise a cable 722 that extends to and is operatively connected to the standardized interface 734 of the compute assembly 630. As illustrated schematically, the cable 722 may extend, retract, coil, uncoil, or otherwise enable extension and retraction of the light assembly 620 relative to the camera and compute assemblies 610, 630.

Figure 8A:
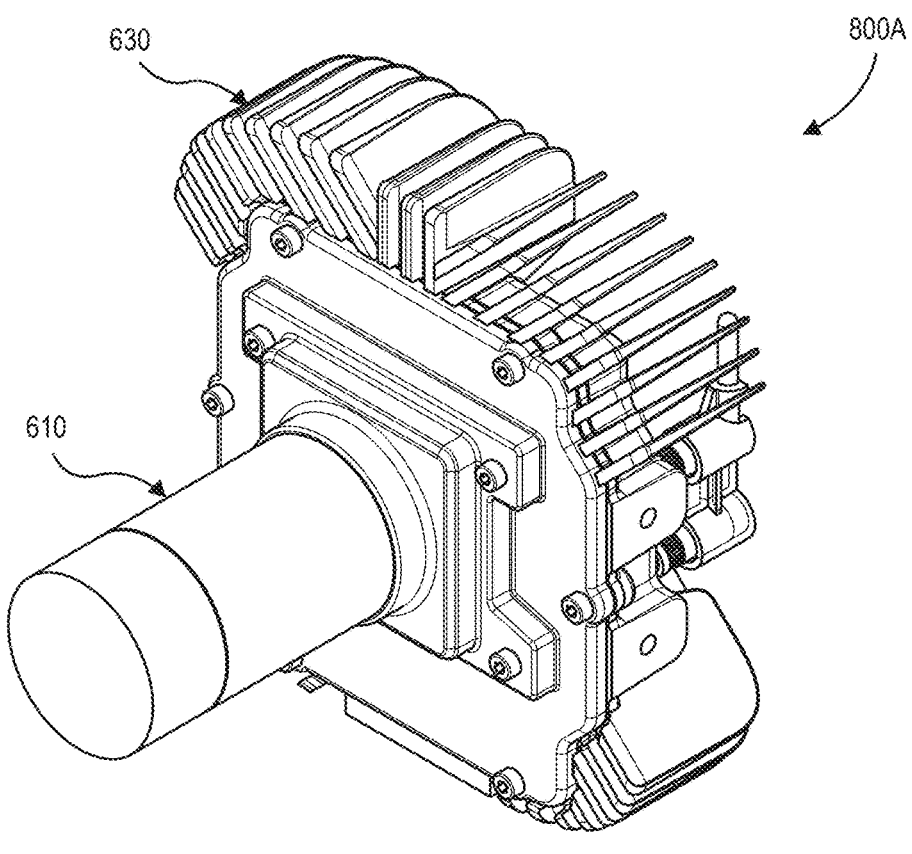
FIG. 8A is a schematic, front perspective view diagram of an example portion of the smart camera system of FIG. 6C, in accordance with implementations of the present disclosure.
Figure 8B:
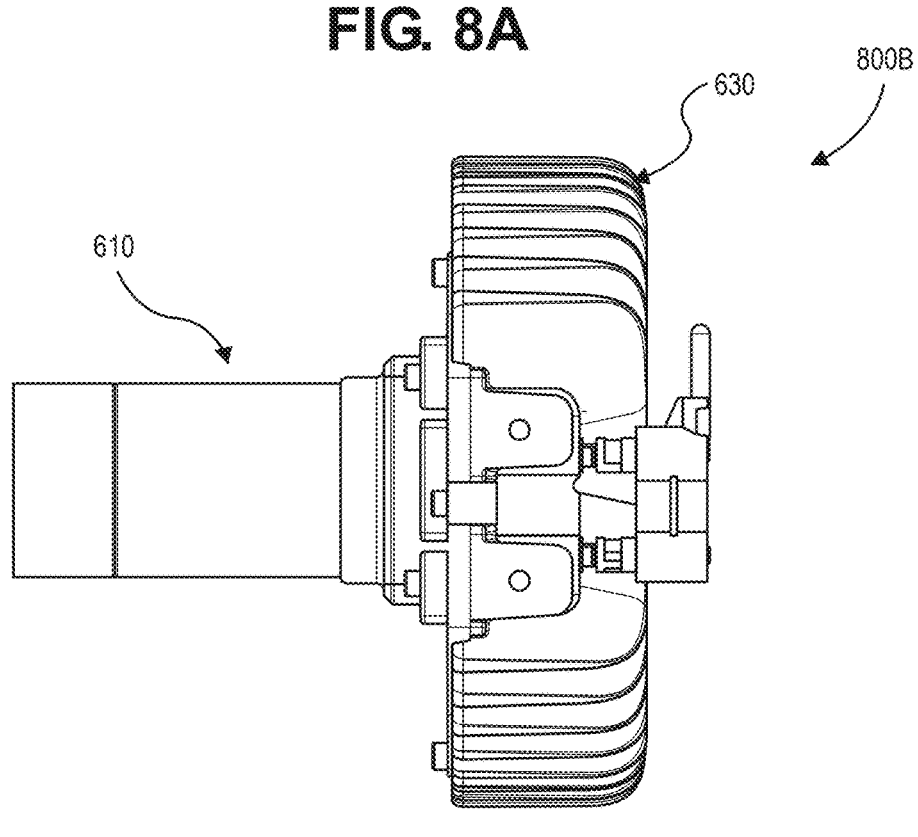
FIG. 8B is a schematic, side view diagram of the example portion of the smart camera system of FIG. 6C, in accordance with implementations of the present disclosure.

FIG. 8A is a schematic, front perspective view diagram 800A of an example portion of the smart camera system of FIG. 6C, in accordance with implementations of the present disclosure, and FIG. 8B is a schematic, side view diagram 800B of the example portion of the smart camera system of FIG. 6C, in accordance with implementations of the present disclosure.

As shown in FIGS. 8A and 8B, a further example smart camera system may comprise a camera assembly 610 and a compute assembly 630, without a light assembly. The various modular assemblies illustrated in FIGS. 8A and 8B may comprise any and all of the features of various camera and compute assemblies described herein at least with respect to FIGS. 1A-6C.

Various other example embodiments of the example smart camera system may comprise other combinations of two or more of the modular assemblies, including combined light and compute assemblies, or combined camera and light assemblies. In addition, other example embodiments such as that illustrated in FIGS. 6A, 6B, 7A, and 7B, may comprise all three modular assemblies.

Furthermore, each of the various example embodiments may include sufficient sealing to meet one or more standards for ingress protection, e.g., an IP52 rating or standard. Some example embodiments may include various additional covers, plugs, inserts, plates, shields, or other elements that are assembled, coupled, or connected to portions of the embodiments to provide sealing. Specifically, if any of the standardized interfaces or connectors described herein are not utilized in some example embodiments, one or more covers, plugs, inserts, plates, shields, or other elements may be coupled or connected to such unused standardized interfaces to provide protection and sealing.

Figure 9:
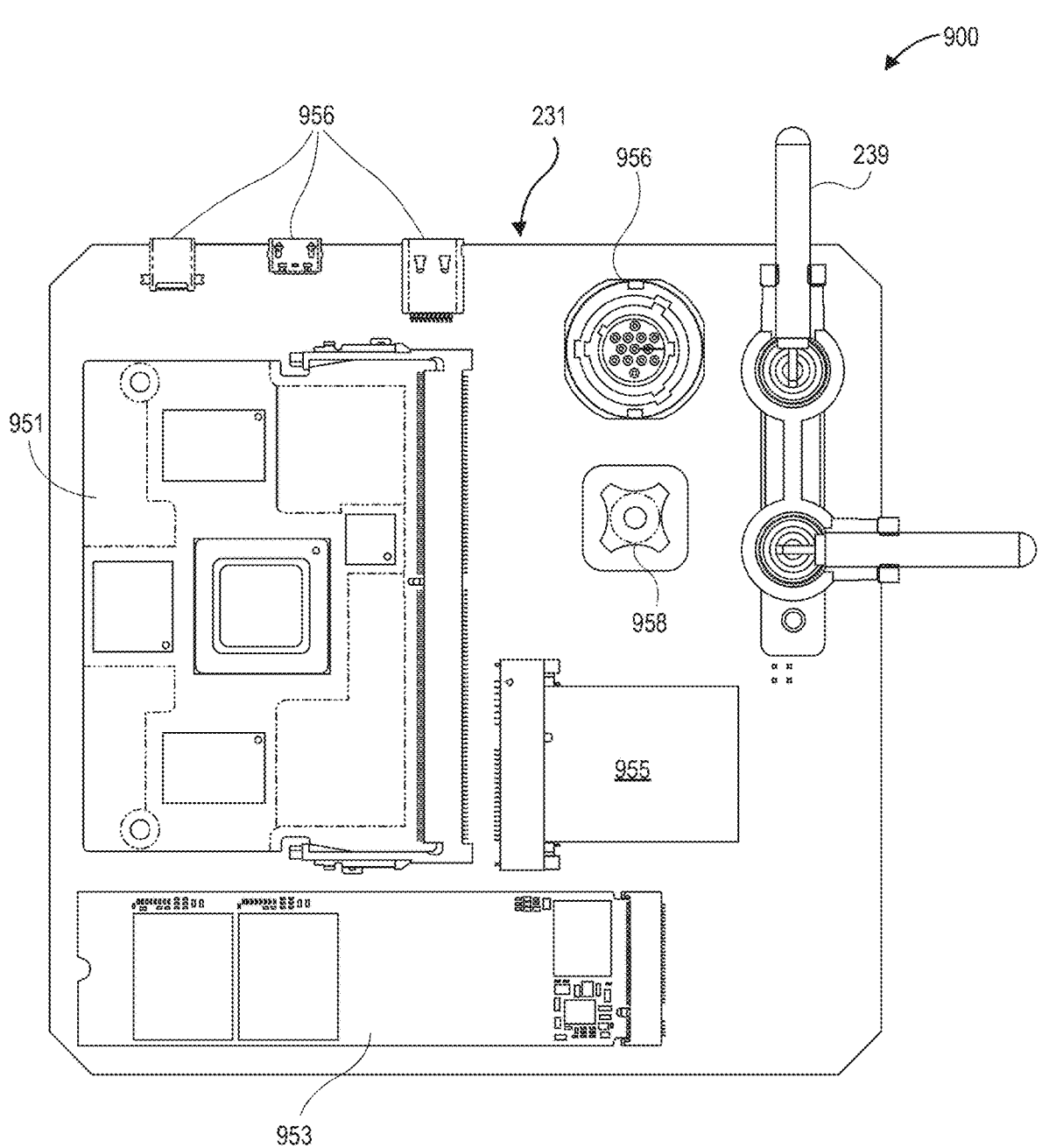
FIG. 9 is a schematic, top down view diagram of an example carrier board assembly of a smart camera system, in accordance with implementations of the present disclosure.

FIG. 9 is a schematic, top down view diagram 900 of an example carrier board assembly of a smart camera system, in accordance with implementations of the present disclosure.

As shown in FIG. 9, the example carrier board PCB or PCBA (printed circuit board assembly) 231 (or 631) may comprise a processor 951, a memory 953, a communication device 955, one or more wireless antennas 239 (or 639), one or more additional external connectors 956, and a button interface 958 for a push button 238.

The processor 951 may be selected from a plurality of different processors. The different processors may comprise various types of processors, such as type, size, processing speed or power, power consumption, or other attributes. In addition, the different processors may comprise different cores, chips, or other components, circuits, or elements. Further, the different processors may each comprise a standardized size, shape, or form factor in order to be interchangeably coupled or connected to a respective standardized slot, interface, or connector of the carrier board PCB 231. The standardized slot, interface, or connector of the carrier board PCB 231 may comprise a common shape, size, form factor, connections, or other aspects that enable physical, mechanical, and electrical connections between the different processors and different carrier board PCBs.

Some example processors may comprise NVIDIA® Orin NX 8 GB or 16 GB processors, NVIDIA® Orin Nano 4 GB or 8 GB processors, or other types of processors. Moreover, the different processors may also be configured, loaded, or programmed to perform various different image processing applications or algorithms. For example, the different image processing applications may comprise identifying or reading barcodes or other identifiers within imaging data, performing image segmentation to identify distinct items within imaging data, identifying or classifying features or objects within imaging data, determining distances or ranges to various features or objects within imaging data, and/or various other types of image processing applications, algorithms, or techniques.

The memory 953 may be selected from a plurality of different memories. The different memories may comprise various types of memories, such as type, size, capacity, power consumption, or other attributes. In addition, the different memories may comprise different solid state drives, flash memories, or other components, circuits, or elements. Further, the different memories may each comprise a standardized size, shape, or form factor in order to be interchangeably coupled or connected to a respective standardized slot, interface, or connector of the carrier board PCB 231. The standardized slot, interface, or connector of the carrier board PCB 231 may comprise a common shape, size, form factor, connections, or other aspects that enable physical, mechanical, and electrical connections between the different memories and different carrier board PCBs.

The communication device 955 may be selected from a plurality of different communication devices. The different communication devices may comprise various types of communication devices, such as type, size, strength, communication protocol, power consumption, or other attributes. In addition, the different communication devices may comprise different Wi-Fi® (wireless fidelity) devices, Bluetooth® devices, NFC (near-field communication) devices, or other components, circuits, or elements. Further, the different communication devices may each comprise a standardized size, shape, or form factor in order to be interchangeably coupled or connected to a respective standardized slot, interface, or connector of the carrier board PCB 231. The standardized slot, interface, or connector of the carrier board PCB 231 may comprise a common shape, size, form factor, connections, or other aspects that enable physical, mechanical, and electrical connections between the different communication devices and different carrier board PCBs.

The one or more wireless antennas 239 may also be selected from a plurality of different wireless antennas. The different wireless antennas, together with the communication device 955, may enable wireless communication between the carrier board PCB 231 of the compute assembly and one or more other computing systems, devices, or communication networks. Various data, information, commands, or instructions may be sent to and/or received from various other computing systems or devices, e.g., commands related to various functions or operations of the smart camera system, and/or imaging, audio, or other data captured or processed by the smart camera system. In some examples, one or more wireless antennas 239 may be used to transfer data to and from other computing systems or devices via communication networks. In other examples, the wireless antennas 239 may be present but not used, and instead, one or more wired connections may be used to transfer data to and from other computing systems or devices.

The one or more additional external connectors 956 may comprise various wired connections to enable transfer of data, information, commands, or instructions relative to other computing systems or devices. For example, the additional external connectors 956 may comprise various types of universal serial bus (USB) connectors, high definition multimedia interface (HDMI) connectors, universal asynchronous receiver-transmitter (UART) connectors, ethernet connectors, or other types of connectors for transfer of data, commands, and/or power. In some examples, one or more additional external connectors 956 may be used to transfer data to and from other computing systems or devices. In other examples, the additional external connectors 956 may be present but not used, and instead, one or more wireless connections may be used to transfer data to and from other computing systems or devices via communication networks.

The button interface 958 may comprise a push button, user interface, or other input element configured to receive manual input from a user or operator, e.g., via a push button 238. As further described herein, the button interface 958 may receive one or more inputs that are associated with various commands or instructions, such as turning on or off, resetting, forced recovery, or other functions or operations of the smart camera system.

In example embodiments described herein, the carrier board PCB 231 is configured to include modular components, circuits, or elements, in order to form a modular compute assembly that can be configured for various different applications or environments. For example, the sizing, capacity, layout, connections, components, circuits, and other aspects are configured to provide the carrier board PCB 231 with a range of capabilities, functions, or operations. As a result, in some applications, various functions or operations may be utilized, whereas in other applications, various functions or operations may remain present but unused or underutilized.

In particular example applications, wireless communication devices and antennas may be used to transfer data, commands, and/or power with other computing systems or devices via communication networks, whereas in other particular example applications, wired communication devices and cables may be used to transfer data, commands, and/or power with other computing systems or devices. Furthermore, various components, circuits, or elements may have excess processing power, capacity, storage, or other capabilities for some applications, whereas in other applications, the available processing power, capacity, storage, or other capabilities may be fully utilized.

Figure 10A:
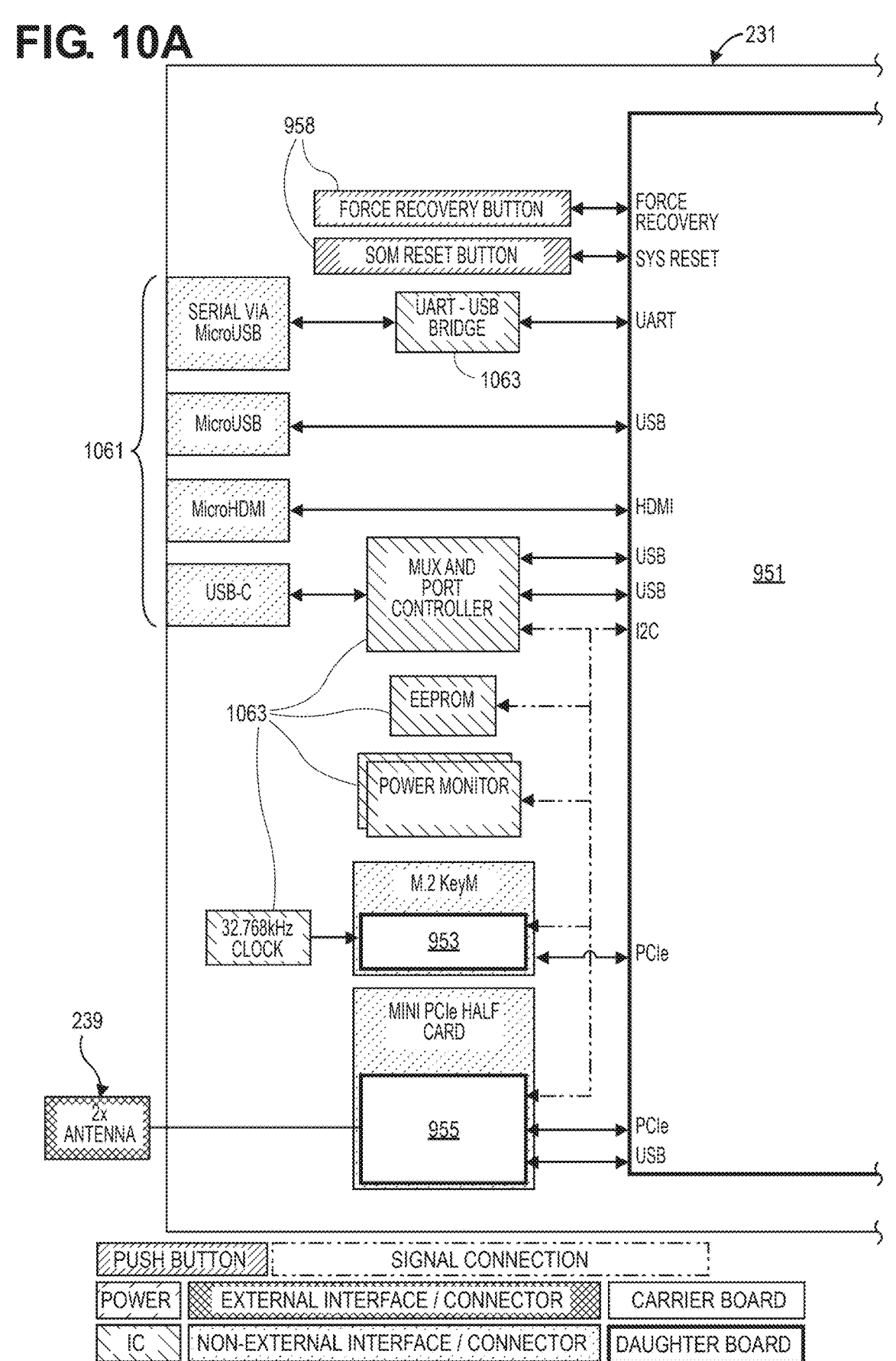
FIGS. 10A-10B are a schematic, block diagram of an example carrier board assembly of a smart camera system, in accordance with implementations of the present disclosure.
Figure 10B:
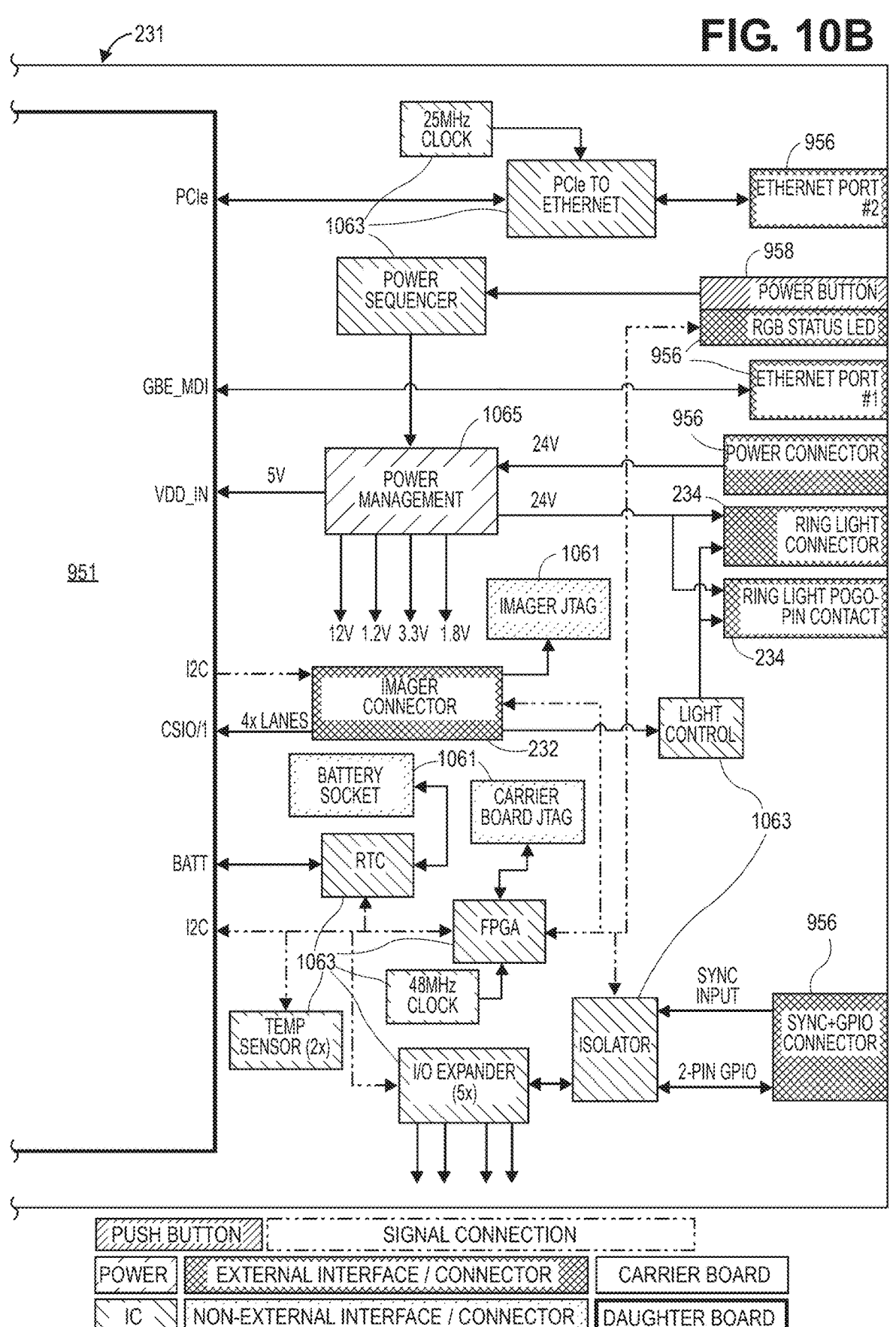

FIGS. 10A-10B are a schematic, block diagram of an example carrier board assembly of a smart camera system, in accordance with implementations of the present disclosure.

As shown in FIGS. 10A and 10B, the carrier board PCB 231 (or 631) may comprise a processor 951, a memory 953, and a wireless communication device 955, each of which may comprise daughter boards that are associated or coupled with the carrier board PCB 231. The processor 951 may be in communication with each of the memory 953 and the wireless communication device 955. In addition, the wireless communication device 955 may be operatively coupled to the wireless antennas 239 (or 639). Further, the processor 951 may also be in communication with one or more button interfaces 958, e.g., related to turning on or off, resetting, or forced recovery of the processor 951 and carrier board PCB 231.

The carrier board PCB 231 may also comprise standardized interfaces or connectors 232, 234 (or 632, 634) to couple or connect with a camera assembly and a light assembly, respectively, as shown in FIG. 10B. Moreover, the processor 951 may be in communication with each of the standardized interfaces 232, 234 to facilitate transfer of data, commands, or power between the compute assembly and the camera assembly and/or light assembly. In some examples, the standardized interfaces 234 may comprise two or more different available interfaces or connectors to the light assembly, e.g., at least a first fixed, non-extending connector, a second cabled, extendible connector, and/or other interfaces.

The processor 951 may also be operatively coupled to various external interfaces or connectors 956, e.g., ethernet ports, power connections, status indicators or lights, time synchronization interfaces, or others, as shown in FIG. 10B. Also, the processor 951 may be operatively coupled to various non-external interfaces or connectors 1061, e.g., USB or micro USB interfaces, micro HDMI interfaces, debugging interfaces, power connectors, or other interfaces or connectors, as shown in FIG. 10A.

Moreover, the carrier board PCB 231 may further comprise various integrated circuits (ICs) 1063 to facilitate, enable, or perform various processing, transfer, or communication of imaging, audio, or other data, e.g., translating or formatting data, combining or multiplexing data, storing data, measuring power consumption or other attributes, measuring temperature of components, maintaining time synchronization between components, sequencing and controlling power provision and distribution, controlling operations of a light assembly, and/or other functions or operations.

In some example embodiments, an integrated circuit 1063 for light control, as shown in FIG. 10B, may facilitate or enable control of various functions or operations of a light assembly by a compute assembly, e.g., carrier board PCB 231, that is coupled to the light assembly. Various attributes of light that may be emitted by the light assembly may be controlled by the compute assembly in such examples. In other examples as described herein, a light assembly may comprise or include an independent or separate IC for light control, e.g., onboard the light PCB, such that the light assembly may control its own functions or operations in the absence of any coupled compute assembly and associated IC 1063 for light control.

Furthermore, the carrier board PCB 231 may comprise a power management component, circuit, or element 1065, as shown in FIG. 10B. The power management component 1065 may facilitate, enable, or control power distribution among the various components of the carrier board PCB 231 of the compute assembly, as well as among other modular assemblies that are coupled or connected with the compute assembly, such as a camera assembly and/or light assembly.

Figure 11A:
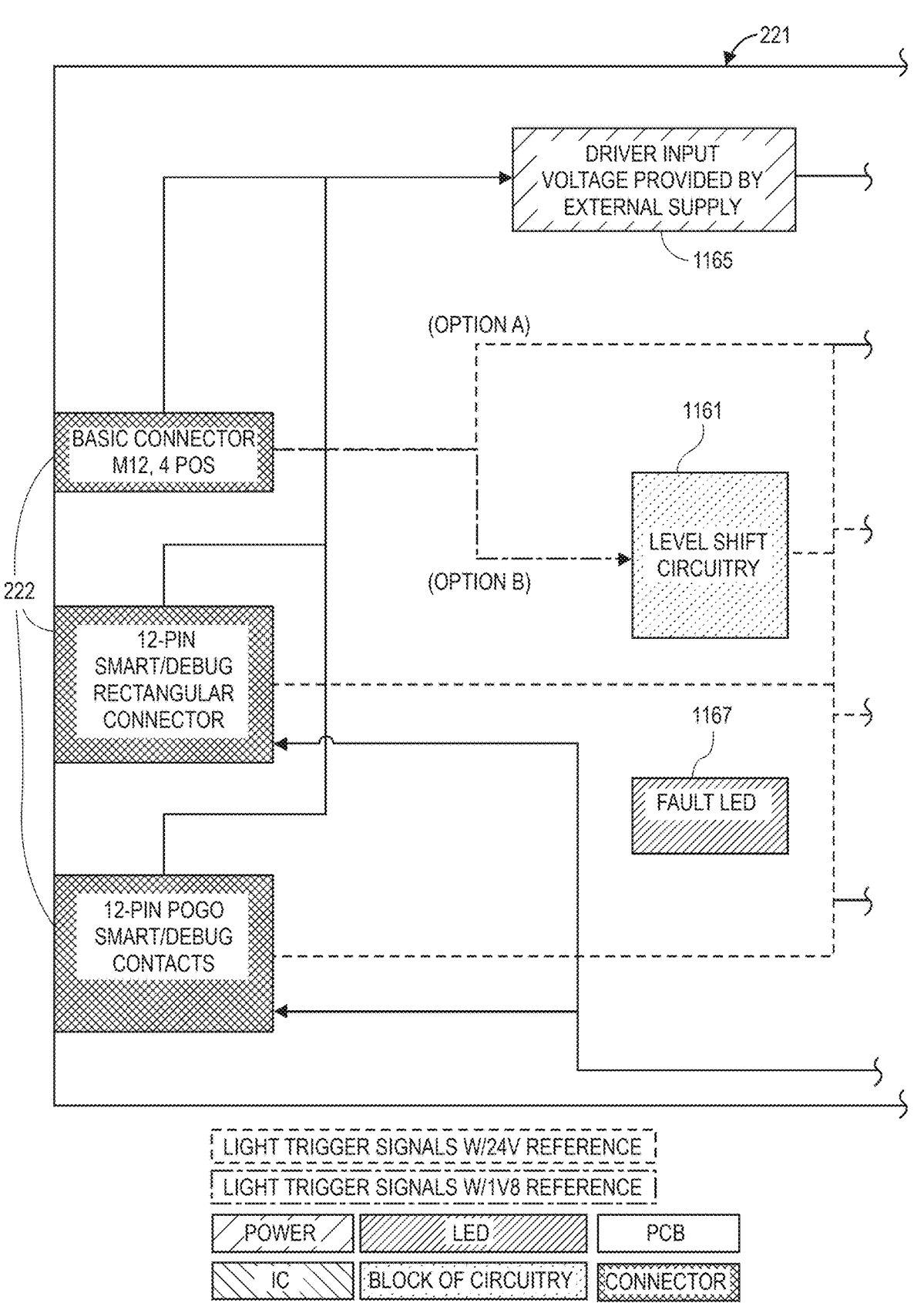
FIGS. 11A-11B are a schematic, block diagram of an example light assembly of a smart camera system, in accordance with implementations of the present disclosure.
Figure 11B:
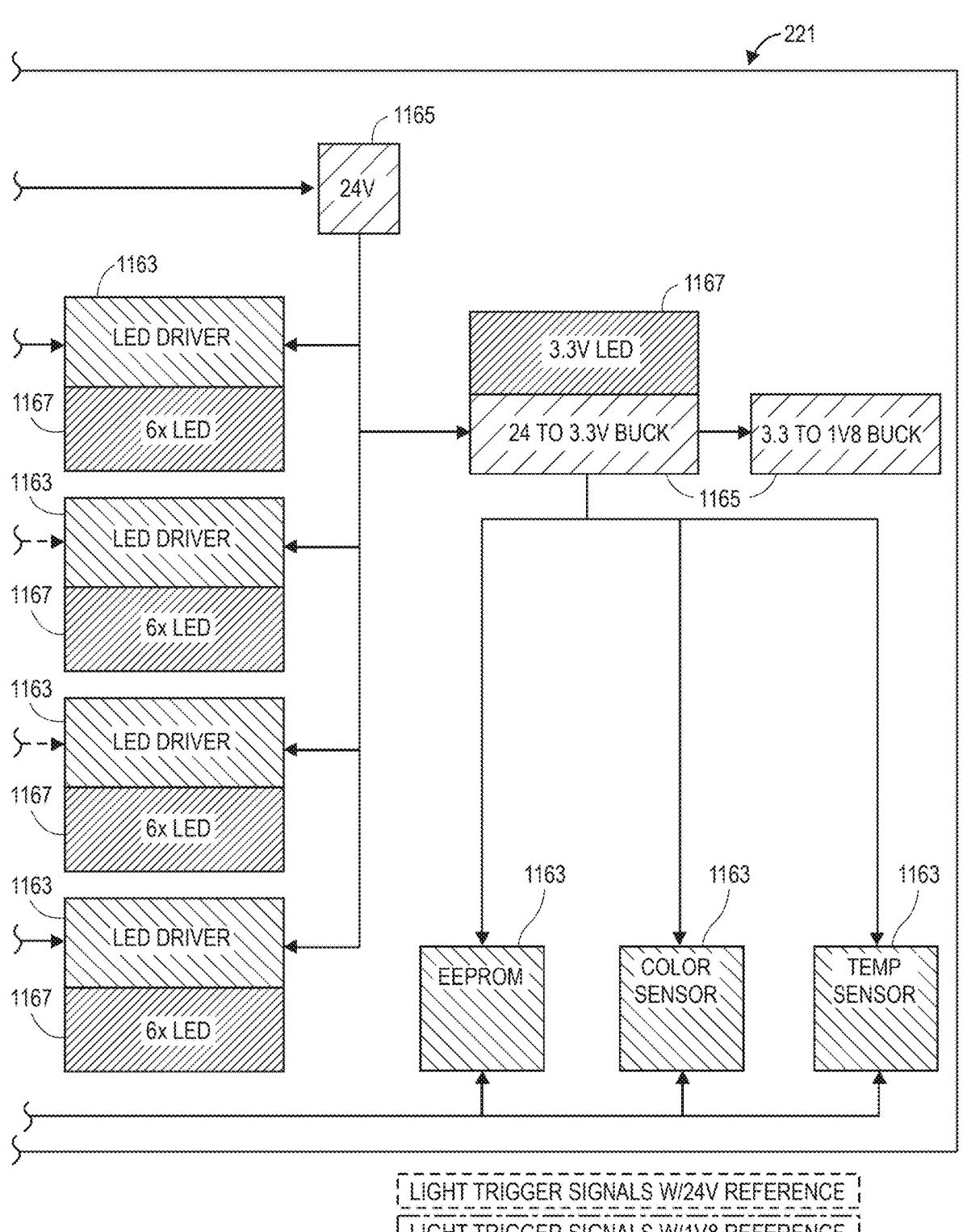

FIGS. 11A-11B are a schematic, block diagram of an example light assembly of a smart camera system, in accordance with implementations of the present disclosure.

As shown in FIGS. 11A and 11B, the light PCB 221 (or 621) may comprise standardized interfaces or connectors 222 (or 622) to couple or connect with a compute assembly. The light PCB 221 may transfer data, commands, or power to and from the compute assembly via the standardized interfaces 222. In some examples, the standardized interfaces 222 may comprise two or more different available interfaces or connectors of the light assembly, e.g., at least a first fixed, non-extending connector, a second cabled, extendible connector, and/or other interfaces.

The light PCB 221 may also comprise a level shift circuitry 1161 to adjust, process, or shift various data, commands, or power for one or more LED drivers of the light PCB 221, as shown in FIG. 11A. The LED drivers may comprise ICs 1163 that are configured to control operations of various individual LEDs 1167 or groups of LEDs 1167 to emit light having various desired attributes based on received data or commands, as shown in FIG. 11B. In the illustrated example, each LED driver may control operations of a group of six LEDs 1167, but in other examples, individual LED drivers may control operations of other numbers or combinations of LEDs 1167.

The light PCB 221 may further comprise various additional ICs 1163 to facilitate, enable, or perform various processing, transfer, or communication of data, e.g., translating or formatting data, combining or multiplexing data, storing data, detecting color or color temperature of LEDs, measuring temperature of LEDs or other components, maintaining time synchronization between components, sequencing and controlling power provision and distribution, controlling operations of the light assembly, and/or other functions or operations.

In some example embodiments, one or more integrated circuits 1163 for light control, e.g., one or more LED drivers, that are associated with the light PCB 221 may facilitate or enable control of various functions or operations of the light assembly. Various attributes of light that may be emitted by the light assembly may be controlled by the ICs 1163 of the light PCB 221 in such examples. In other examples as described herein, a light assembly may be coupled to a compute assembly, e.g., including a carrier board PCB 231, and various functions or operations of the light assembly may be controlled by an IC for light control that is associated with the carrier board PCB 231, when the light assembly is coupled to the compute assembly as a smart camera system.

The various light functions or operations may comprise different brightness or power, different color temperatures, various strobing or flashing functions, various lighting modes, patterns, or sequences, various operational modes including continuous, intermittent, triggered, or other modes, various dimming functions, or other light characteristics or attributes of light emitted by one or more LEDs. In addition, the various dimming functions may comprise analog dimming, pulse width modulated dimming, or combinations thereof.

Furthermore, the light PCB 221 may comprise various power management or distribution components, circuits, or elements 1165. The power management components 1165 may facilitate, enable, or control power distribution among the various components of the light PCB 221 of the light assembly, which power may be received or distributed from an external power source or supply, and/or via a coupled or connected compute assembly of a smart camera system.

Figure 12:
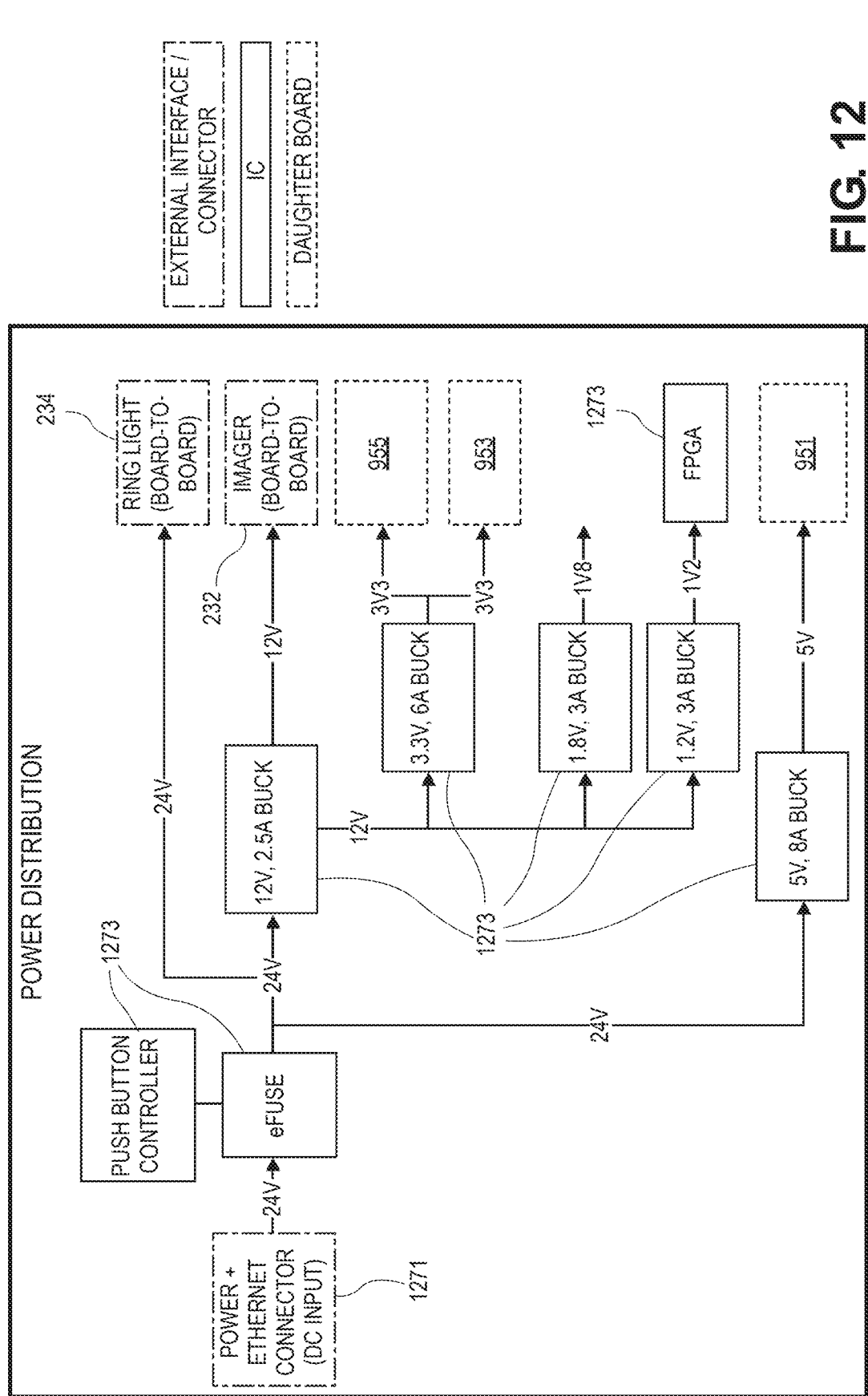
FIG. 12 is a schematic, block diagram of an example power distribution of a smart camera system, in accordance with implementations of the present disclosure.

FIG. 12 is a schematic, block diagram of an example power distribution of a smart camera system, in accordance with implementations of the present disclosure.

As shown in FIG. 12, provision and distribution of power to modular assemblies and various components of a smart camera system may be enabled, controlled, or managed by portions of a compute assembly, e.g., a carrier board PCB 231 (or 631), or other components, circuits, or elements, e.g., power management component 1065 of carrier board PCB 231.

For example, power may be received from an external power source or supply via a power or ethernet connector 1271 coupled or connected to the power management component 1065 of the carrier board PCB 231. Various ICs 1273 may receive the supplied power to facilitate, enable, or perform various modification, processing, distribution, and/or transmission of power, e.g., adjusting or modifying voltage, current, or other attributes, preventing transmission of excessive or damaging current, sequencing and controlling power provision and distribution, and/or other functions or operations.

Then, power may be distributed to various assemblies or components of a smart camera system with desired or appropriate attributes. For example, power may be provided to standardized interfaces 232, 234 (or 632, 634) of the compute assembly, in order to provide or transfer power to coupled or connected camera assemblies or light assemblies, respectively. In addition, power may be provided to each of the processor 951, memory 953, and communication device 955 of the compute assembly. Further, various other non-external and/or external interfaces or connectors may be included and available to connect to one or more other modular assemblies, components, circuits, elements, peripherals, accessories, or others, as may be desired for the smart camera system.

Figure 13:
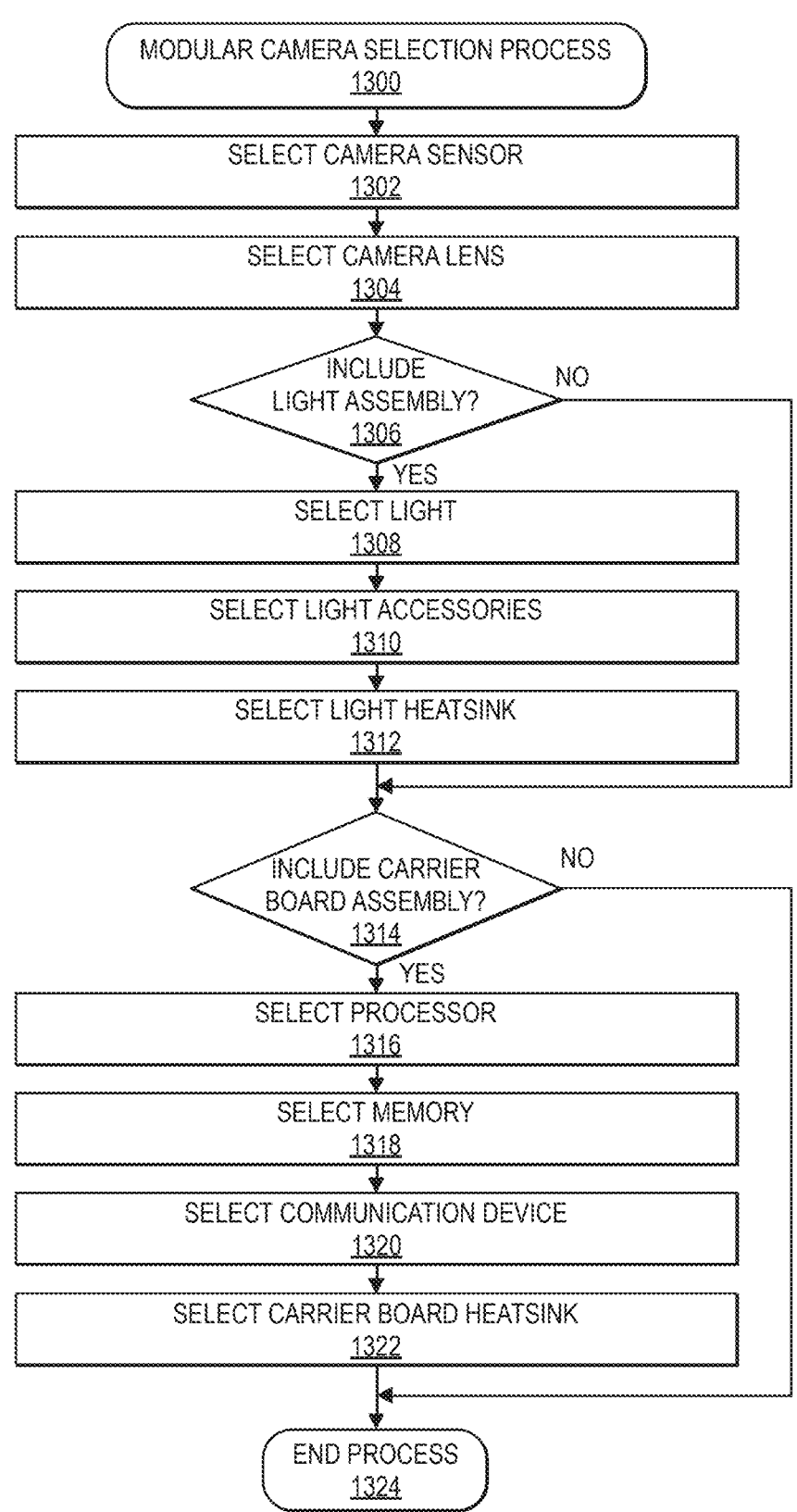
FIG. 13 is a flow diagram illustrating an example modular camera selection process, in accordance with implementations of the present disclosure.

FIG. 13 is a flow diagram illustrating an example modular camera selection process 1300, in accordance with implementations of the present disclosure.

The process 1300 may begin by selecting a camera sensor, as at 1302. For example, an imaging sensor may be selected from a plurality of imaging sensors. Each of the plurality of imaging sensors may have a similar size, shape, or form factor, in order to be coupled with a camera housing having a standardized opening or aperture to receive an imaging sensor. In addition, the different imaging sensors may have various different image capture capabilities, characteristics, software, applications, or other attributes as described herein, which may be selected based on a desired application or environment of a smart camera system.

The process 1300 may continue by selecting a camera lens, as at 1304. For example, a lens may be selected from a plurality of lenses. Each of the plurality of lenses may have a similar size, shape, or form factor, in order to be coupled with a camera housing having a standardized opening or aperture to receive the lens. In addition, the different lenses may have various different image capture properties or attributes as described herein, which may be selected based on a desired application or environment of a smart camera system.

The process 1300 may then proceed to determine whether to include a light assembly, as at 1306. For example, a camera assembly may be used independently of other modular assemblies, or may be used together with a light assembly and/or a compute assembly. Although not illustrated in FIG. 13, in other examples, a light assembly may be used independently of other modular assemblies, and/or a compute assembly may also be used independently of other modular assemblies. In further examples, a camera assembly, a light assembly, and a compute assembly may be used together in various combinations of two or more modular assemblies.

If it is determined to include a light assembly, the process 1300 may continue to select a light, as at 1308. For example, a light or light PCB may be selected from a plurality of lights or light PCBs. Each of the plurality of light PCBs may have a similar size, shape, or form factor, in order to be coupled with a camera housing having a standardized interface to couple or connect with the light PCBs. In addition, the different light PCBs may have various different lighting capabilities, characteristics, software, applications, or other attributes as described herein, which may be selected based on a desired application or environment of a smart camera system.

The process 1300 may proceed to select light accessories, as at 1310. For example, one or more light accessories may be selected from a plurality of light accessories, e.g., covers, diffusers, baffles, polarizers, or others. Each of the plurality of light accessories may have a similar size, shape, or form factor, in order to be coupled with a light PCB having a standardized interface to couple or connect with the light accessories. In addition, the different light accessories may have various different light modification properties or attributes as described herein, which may be selected based on a desired application or environment of a smart camera system.

The process 1300 may then continue with selecting a light heatsink, as at 1312. For example, one or more light heatsinks may be selected from a plurality of light heatsinks. Each of the plurality of light heatsinks may have a similar size, shape, or form factor, in order to be coupled with a light PCB and/or a camera housing having a standardized interface to couple or connect with the light heatsinks. In addition, the different light heatsinks may have various different heat dissipation properties or attributes as described herein, which may be selected based on a desired application or environment of a smart camera system.

The process 1300 may then proceed to determine whether to include a carrier board or compute assembly, as at 1314. For example, the camera assembly and/or the light assembly may be used independently of other modular assemblies, or may be used together with a compute assembly. Although not illustrated in FIG. 13, in other examples, a light assembly may be used independently of other modular assemblies, and/or a compute assembly may also be used independently of other modular assemblies. In further examples, a camera assembly, a light assembly, and a compute assembly may be used together in various combinations of two or more modular assemblies.

If it is determined to include a carrier board or compute assembly, the process 1300 may proceed with selecting a processor, as at 1316. For example, a processor may be selected from a plurality of processors. Each of the plurality of processors may have a similar size, shape, or form factor, in order to be coupled with a carrier board PCB of a compute assembly having a standardized interface to couple or connect with the processors. In addition, the different processors may have various different processing capabilities, characteristics, software, applications, or other attributes as described herein, which may be selected based on a desired application or environment of a smart camera system.

The process 1300 may continue by selecting a memory, as at 1318. For example, a memory may be selected from a plurality of memories. Each of the plurality of memories may have a similar size, shape, or form factor, in order to be coupled with a carrier board PCB of a compute assembly having a standardized interface to couple or connect with the memories. In addition, the different memories may have various different storage capabilities, characteristics, software, applications, or other attributes as described herein, which may be selected based on a desired application or environment of a smart camera system.

The process 1300 may then proceed by selecting a communication device, as at 1320. For example, a communication device may be selected from a plurality of communication devices. Each of the plurality of communication devices may have a similar size, shape, or form factor, in order to be coupled with a carrier board PCB of a compute assembly having a standardized interface to couple or connect with the communication devices. In addition, the different communication devices may have various different communication capabilities, characteristics, software, applications, or other attributes as described herein, which may be selected based on a desired application or environment of a smart camera system.

The process 1300 may then continue with selecting a carrier board heatsink, as at 1322. For example, one or more carrier board heatsinks may be selected from a plurality of carrier board heatsinks. Each of the plurality of carrier board heatsinks may have a similar size, shape, or form factor, in order to be coupled with a carrier board PCB, a camera housing, and/or light assembly having a standardized interface to couple or connect with the carrier board heatsinks. In addition, the different carrier board heatsinks may have various different heat dissipation properties or attributes as described herein, which may be selected based on a desired application or environment of a smart camera system.

The process may then end, as at 1324.

Although not explicitly shown or described with respect to FIG. 13, various other components, circuits, or elements of the modular assemblies of a smart camera system may also be selected and then assembled or combined together to form a modular smart camera system based on a desired application or environment. For example, springs or other components of a camera assembly may be selected based on a desired application or environment, and/or gaskets, push buttons, user interface elements, wireless antennas, non-external or external connectors, or other components of a compute assembly may also be selected based on a desired application or environment. Moreover, various circuits, drivers, sensors, or other electrical components of the imaging sensor, the light PCB, and/or the carrier board PCB may be selected based on a desired application or environment.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 13, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A smart camera system, comprising:

a camera assembly comprising a camera housing with an imaging sensor and a lens coupled to the camera housing, the imaging sensor comprising a first standardized interface that is configured to couple to a carrier board assembly, wherein the imaging sensor comprises one of a plurality of imaging sensors configured to couple to the camera housing and form a portion of the camera assembly, each of the plurality of imaging sensors having the first standardized interface;

the carrier board assembly comprising a carrier board PCBA (printed circuit board assembly), the carrier board assembly comprising a second standardized interface that is configured to couple to the first standardized interface of the imaging sensor, and a third standardized interface that is configured to couple to a light assembly; and the light assembly comprising a light PCBA, the light assembly comprising a fourth standardized interface that is configured to couple to the third standardized interface of the carrier board assembly.

2. The smart camera system of claim 1, wherein the lens comprises one of a plurality of lenses configured to couple to the camera housing and form a portion of the camera assembly.

3. The smart camera system of claim 1, wherein the carrier board PCBA comprises at least one of a processor, a memory, or a communication device that are coupled via respective standardized slots; and wherein the processor comprises one of a plurality of processors configured to couple to the carrier board PCBA via a first standardized slot and form a portion of the carrier board assembly, the memory comprises one of a plurality of memories configured to couple to the carrier board PCBA via a second standardized slot and form a portion of the carrier board assembly, and the communication device comprises one of a plurality of communication devices configured to couple to the carrier board PCBA via a third standardized slot and form a portion of the carrier board assembly.

4. The smart camera system of claim 1, wherein the second standardized interface of the carrier board assembly is associated with a first side of the carrier board PCBA; and wherein the third standardized interface of the carrier board assembly is associated with the first side of the carrier board PCBA, and extends at least partially through an opening of the camera housing.

5. The smart camera system of claim 1, wherein the light PCBA comprises one of a plurality of light PCBAs configured to form a portion of the light assembly, each of the plurality of light PCBAs having the fourth standardized interface.

6. A system, comprising:

a camera assembly comprising a camera housing with an imaging sensor and a lens coupled to the camera housing, the imaging sensor comprising a first standardized interface that is configured to couple to a carrier board assembly, wherein the imaging sensor comprises one of a plurality of imaging sensors configured to couple to the camera housing and form a portion of the camera assembly, each of the plurality of imaging sensors having the first standardized interface; and the carrier board assembly comprising a carrier board PCBA (printed circuit board assembly), the carrier board assembly comprising a second standardized interface that is configured to couple to the first standardized interface of the imaging sensor, and a third standardized interface that is configured to couple to a light assembly.

7. The system of claim 6, wherein the imaging sensor comprises at least one of a color, black and white, high resolution, low resolution, rolling shutter, or global shutter imaging sensor;

wherein the lens comprises at least one of a C-mount lens or an S-mount lens; and wherein the lens is coupled to the camera housing via a spring element.

8. The system of claim 6, wherein the camera assembly further comprises a thermal insulator associated with a portion of the camera housing; and wherein the thermal insulator is positioned between the imaging sensor of the camera assembly and the carrier board PCBA of the carrier board assembly to insulate the imaging sensor from heat generated by the carrier board PCBA.

9. The system of claim 6, wherein the carrier board assembly further comprises a heatsink, a gasket, and at least one antenna;

wherein the gasket is configured to form a seal around the carrier board assembly and the imaging sensor of the camera assembly; and wherein the at least one antenna is configured to operatively couple to a communication device of the carrier board PCBA.

10. The system of claim 6, wherein the carrier board PCBA further comprises a processor, a memory, and a communication device that are coupled via respective standardized slots; and wherein the processor comprises one of a plurality of processors configured to couple to the carrier board PCBA via a first standardized slot and form a portion of the carrier board assembly, the memory comprises one of a plurality of memories configured to couple to the carrier board PCBA via a second standardized slot and form a portion of the carrier board assembly, and the communication device comprises one of a plurality of communication devices configured to couple to the carrier board PCBA via a third standardized slot and form a portion of the carrier board assembly.

11. The system of claim 6, further comprising:

the light assembly comprising a light PCBA, the light assembly comprising a fourth standardized interface that is configured to couple to the third standardized interface of the carrier board assembly;

wherein the light PCBA further comprises a plurality of light emitting elements on a first side of the light PCBA; and wherein the fourth standardized interface is associated with a second side of the light PCBA that is opposite to the first side.

12. The system of claim 11, wherein the light assembly further comprises a heatsink and at least one of a cover, diffuser, baffle, or polarizer.

13. The system of claim 11, wherein at least one of the third standardized interface or the fourth standardized interface extends at least partially through an opening of the camera housing.

14. The system of claim 11, further comprising a connector that is coupled between the third and fourth standardized interfaces;

wherein the connector comprises a cabled, extendible connector; and wherein the light assembly is extendible or retractable relative to the camera assembly and the carrier board assembly.

15. A method, comprising:

selecting, from a plurality of imaging sensors, an imaging sensor to couple to a camera housing, each of the plurality of imaging sensors comprising a first standardized interface to a carrier board assembly;

selecting, from a plurality of carrier board PCBAs, a carrier board PCBA of the carrier board assembly to couple to the camera housing, each of the plurality of carrier board PCBAs comprising a second standardized interface that is configured to couple to the first standardized interface of the imaging sensor, and a third standardized interface that is configured to couple to a light assembly; and selecting, from a plurality of light PCBAs, a light PCBA of the light assembly to couple to the camera housing, each of the light PCBAs comprising a fourth standardized interface that is configured to couple to the third standardized interface of the carrier board assembly.

16. The method of claim 15, further comprising:

selecting, from a plurality of lenses, a lens to couple to the camera housing and the imaging sensor.

17. The method of claim 15, further comprising at least one of:

selecting, from a plurality of heatsinks, a heatsink of the carrier board assembly;

selecting, from a plurality of gaskets, a gasket of the carrier board assembly; or selecting, from a plurality of antennas, at least one antenna of the carrier board assembly.

18. The method of claim 15, further comprising:

selecting, from respective pluralities of processors, memories, and communication devices, at least one of a processor, a memory, or a communication device to couple to the carrier board PCBA via respective standardized slots;

wherein individual ones of the plurality of processors are configured to perform at least one of barcode identification, image segmentation, or feature or object identification upon imaging data captured by the imaging sensor.

19. The method of claim 15, further comprising at least one of:

selecting, from a plurality of heatsinks, a heatsink of the light assembly; or selecting, from respective pluralities of covers, diffusers, baffles, or polarizers, at least one of a cover, diffuser, baffle, or polarizer of the light assembly.

* * * * *